United States Patent
Nishino et al.

(10) Patent No.: US 10,145,741 B2
(45) Date of Patent: Dec. 4, 2018

(54) HEAT SOURCE DETECTION DEVICE AND HEAT SOURCE DETECTION METHOD

(71) Applicant: FUJITSU LIMITED, Kawasaki-shi, Kanagawa (JP)

(72) Inventors: Hironori Nishino, Isehara (JP); Yasuo Matsumiya, Hadano (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/609,425

(22) Filed: May 31, 2017

(65) Prior Publication Data

US 2018/0031425 A1 Feb. 1, 2018

(30) Foreign Application Priority Data

Jul. 27, 2016 (JP) ................................. 2016-147852

(51) Int. Cl.
*G01J 5/00* (2006.01)
*G01J 5/60* (2006.01)

(52) U.S. Cl.
CPC ............... *G01J 5/0003* (2013.01); *G01J 5/60* (2013.01); *G01J 2005/0081* (2013.01)

(58) Field of Classification Search
CPC ..................... G01J 5/0003; G01J 2005/0081
USPC ..................... 250/208.1, 226, 339.14, 338.1
See application file for complete search history.

(56) References Cited

U.S. PATENT DOCUMENTS

| 2,674,155 | A | * | 4/1954 | Gibson | ...................... | G01J 5/60 |
| | | | | | | 250/204 |
| 4,790,669 | A | * | 12/1988 | Christensen | ............ | G01J 5/601 |
| | | | | | | 250/227.23 |
| 5,153,563 | A | * | 10/1992 | Goto | ......................... | G01J 5/60 |
| | | | | | | 236/49.2 |

(Continued)

FOREIGN PATENT DOCUMENTS

| JP | 2004-085391 | 3/2004 |
| JP | 2009-047611 | 3/2009 |

OTHER PUBLICATIONS

Kuramoto, Y. and Okuda, H., "High-accuracy absolute distance measurement by two-wavelength double heterodyne interferometry with variable synthetic wavelengths", 2014, arXiv:1402.5575v1.*

*Primary Examiner* — David Porta
*Assistant Examiner* — Blake Riddick
(74) *Attorney, Agent, or Firm* — Fujitsu Patent Center

(57) ABSTRACT

A heat source detection device includes a processor configured to calculate, as a single-wavelength temperature, one of a first temperature obtained by converting a first output output from the infrared sensor in accordance with an incident amount of infrared rays in a first infrared wavelength band into a temperature, a second temperature obtained by converting a second output from the infrared sensor in accordance with an incident amount of infrared rays in a second infrared wavelength band into a temperature and an average value of the first and second temperatures, and calculate a dual-wavelength temperature obtained by converting the ratio between the first and second outputs into (Continued)

a temperature; and to determine a temperature of the heat source based on the dual-wavelength temperature and determine a distance to the heat source from the infrared sensor based on a comparison result between the single-wavelength temperature and dual-wavelength temperature.

8 Claims, 25 Drawing Sheets

(56) References Cited

U.S. PATENT DOCUMENTS

| | | | | |
|---|---|---|---|---|
| 5,258,614 A * | 11/1993 | Kidwell | ................. | G01K 11/32 250/227.14 |
| 5,326,173 A * | 7/1994 | Evans | ................... | G01J 5/0022 250/341.7 |
| 5,868,496 A * | 2/1999 | Spitzberg | .............. | G01J 5/0003 250/339.04 |
| 6,168,311 B1 * | 1/2001 | Xiao | ........................ | G01J 5/58 250/227.11 |
| 6,230,108 B1 * | 5/2001 | Matsuda | ................. | G01J 5/524 250/208.1 |
| 2009/0237656 A1 * | 9/2009 | Ma | ............................ | G01J 3/02 356/300 |
| 2009/0296776 A1 * | 12/2009 | Riza | ...................... | G01J 5/0014 374/130 |
| 2010/0065729 A1 * | 3/2010 | Legras | ...................... | G01J 5/24 250/252.1 |
| 2010/0082943 A1 * | 4/2010 | Yamamoto | .......... | G06F 15/7867 712/43 |
| 2010/0256945 A1 * | 10/2010 | Murata | ................. | G01J 5/0003 702/134 |
| 2010/0314543 A1 * | 12/2010 | Lee | ........................... | G01J 3/02 250/330 |
| 2012/0183013 A1 * | 7/2012 | Stein | ....................... | G01J 5/602 374/130 |
| 2013/0070079 A1 * | 3/2013 | Zitterbart | ................. | G06K 9/00 348/81 |
| 2013/0097882 A1 * | 4/2013 | Bridges | ................ | G01B 11/005 33/503 |
| 2014/0175260 A1 * | 6/2014 | Futakuchi | ............ | G01S 3/7861 250/203.4 |

* cited by examiner

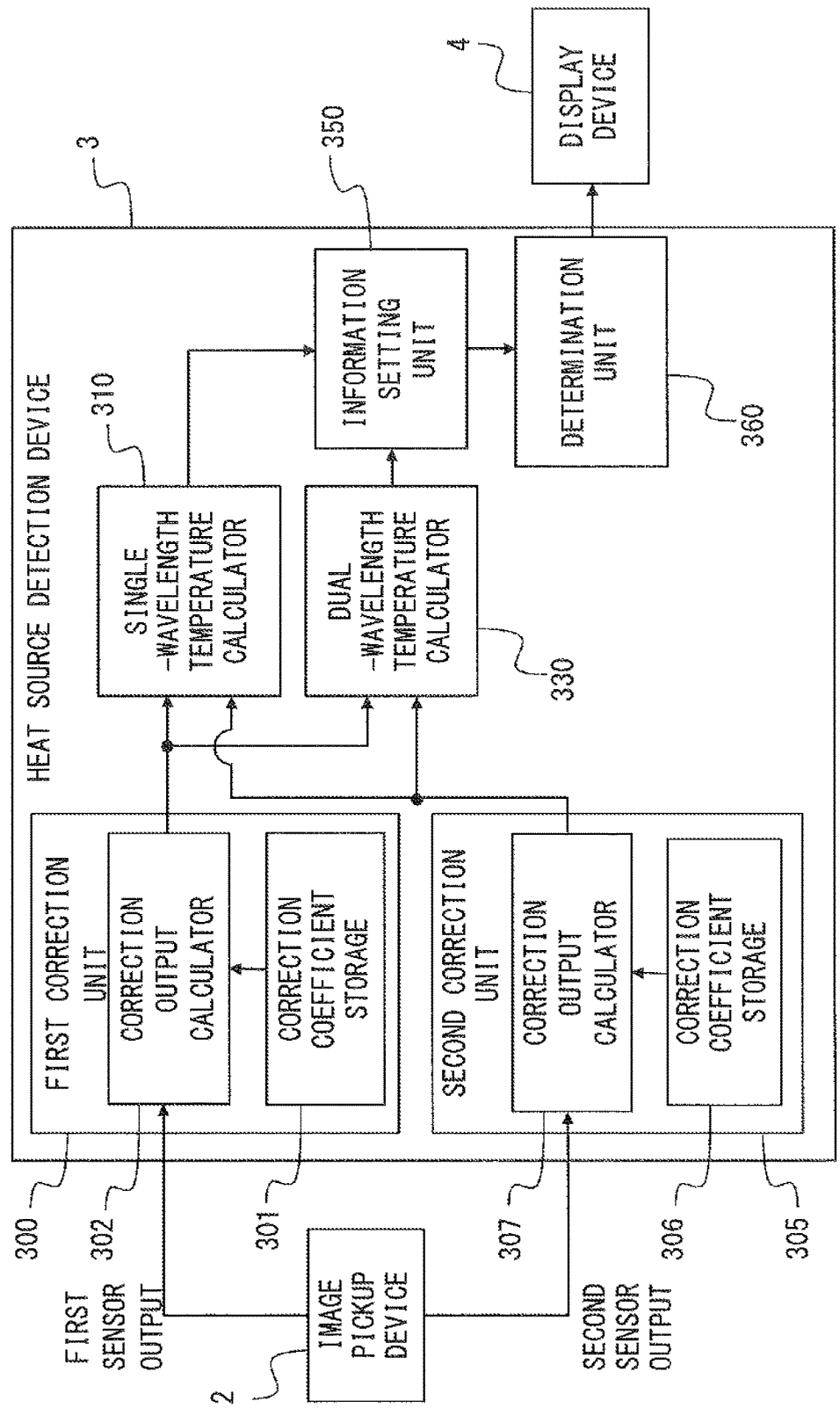
F I G. 3

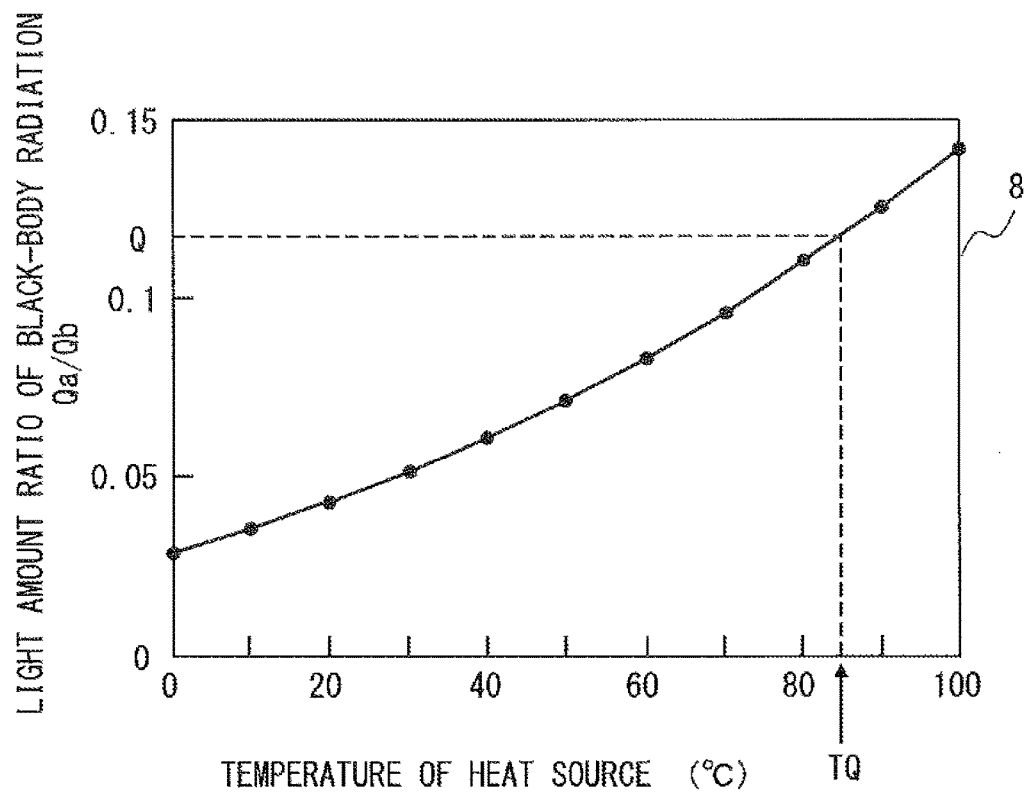
F I G. 6

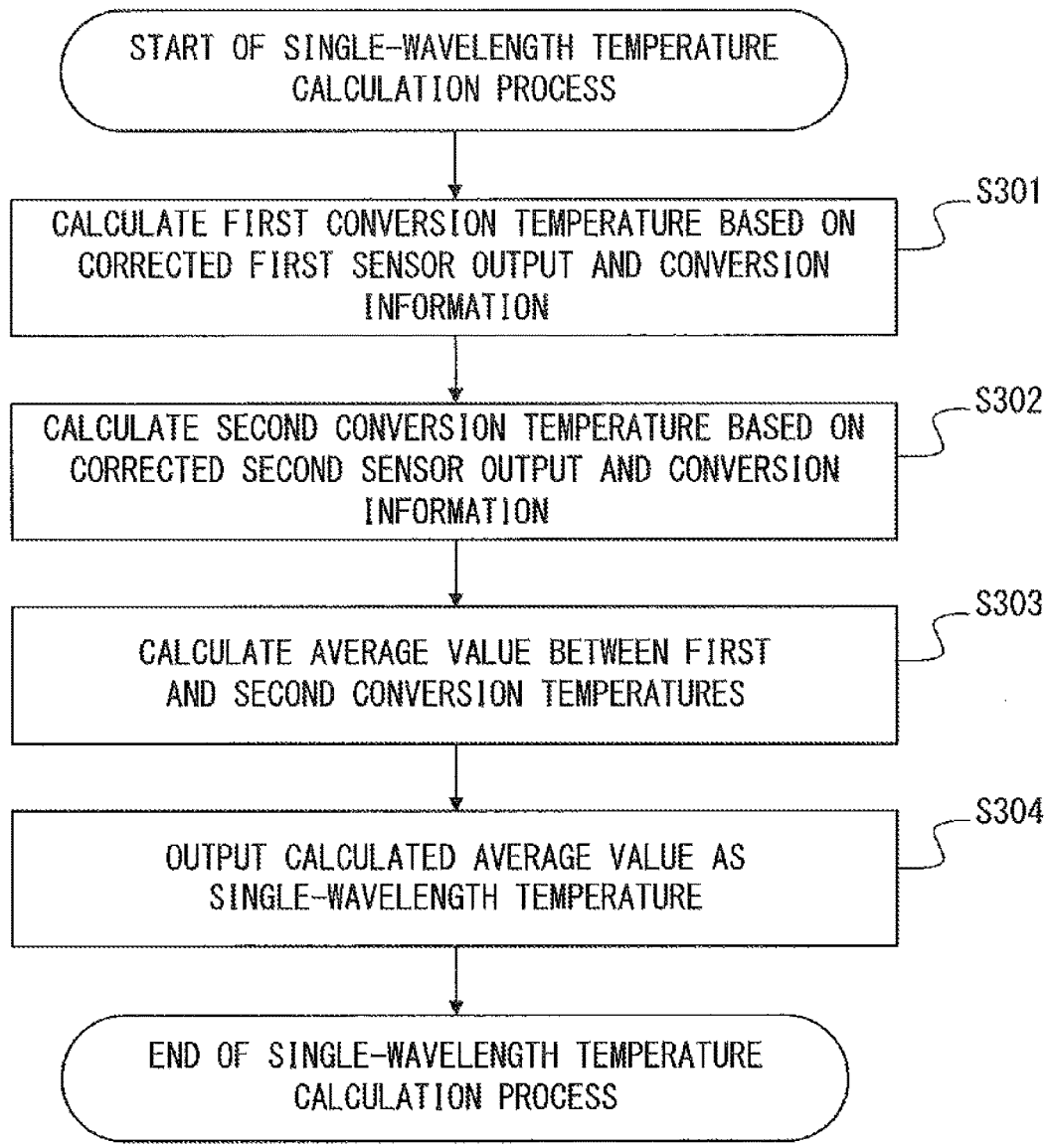
F I G. 9

| HEAT SOURCE INFORMATION VALUE | DISTANCE INFORMATION VALUE | DETERMINATION RESULT |
|---|---|---|
| 0 | 0 | NO HIGH-TEMPRATURE HEAT SOURCE IN WATCHING ANGLE OF THAT PIXEL |
| 0 | 1 | |
| 1 | 0 | THERE IS HIGH-TEMPRATURE HEAT SOURCE LOCATED AT SHORT DISTANCE |
| 1 | 1 | THERE IS HIGH-TEMPRATURE HEAT SOURCE LOCATED AT LONG DISTANCE |

F I G. 1 2

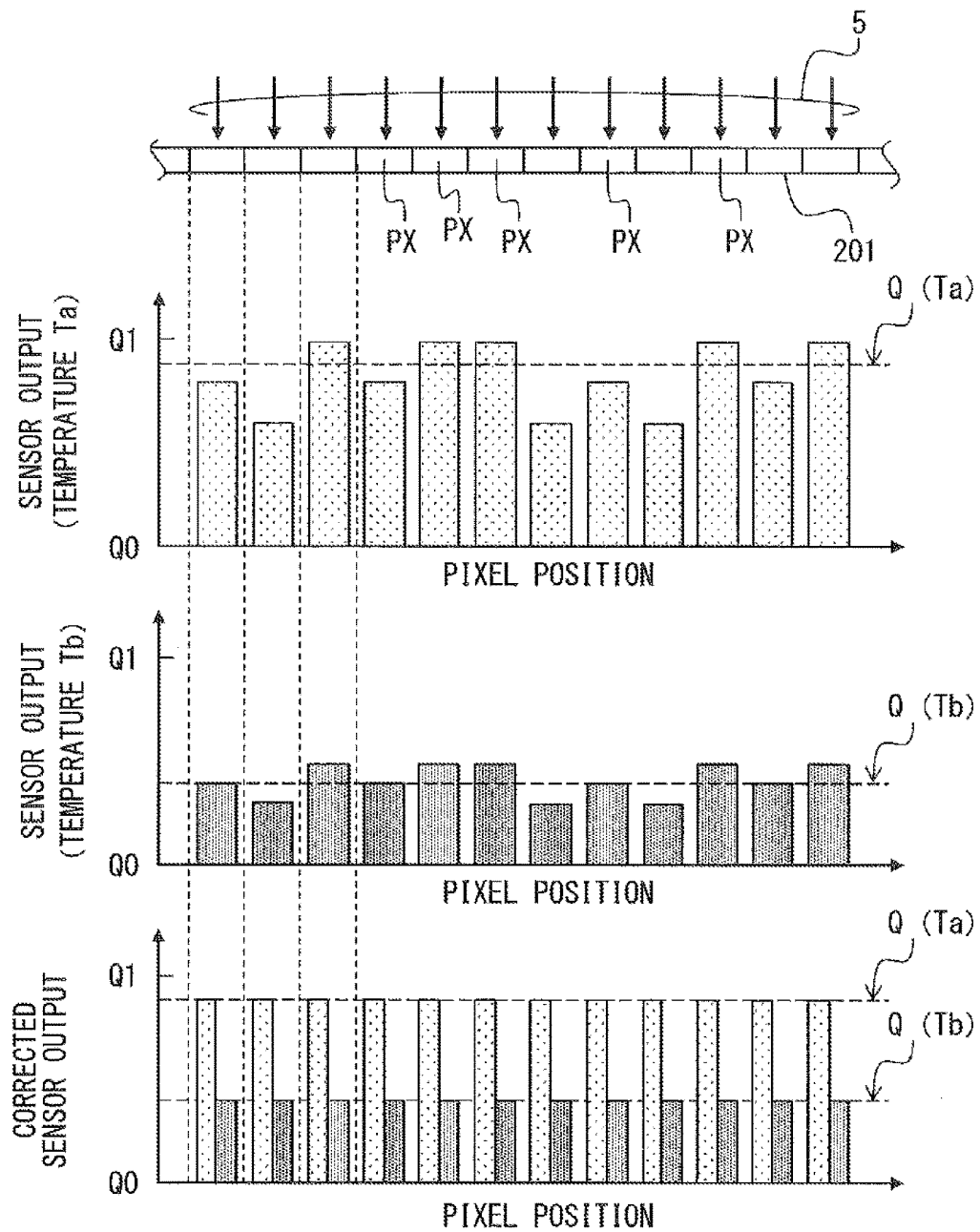
F I G. 1 3

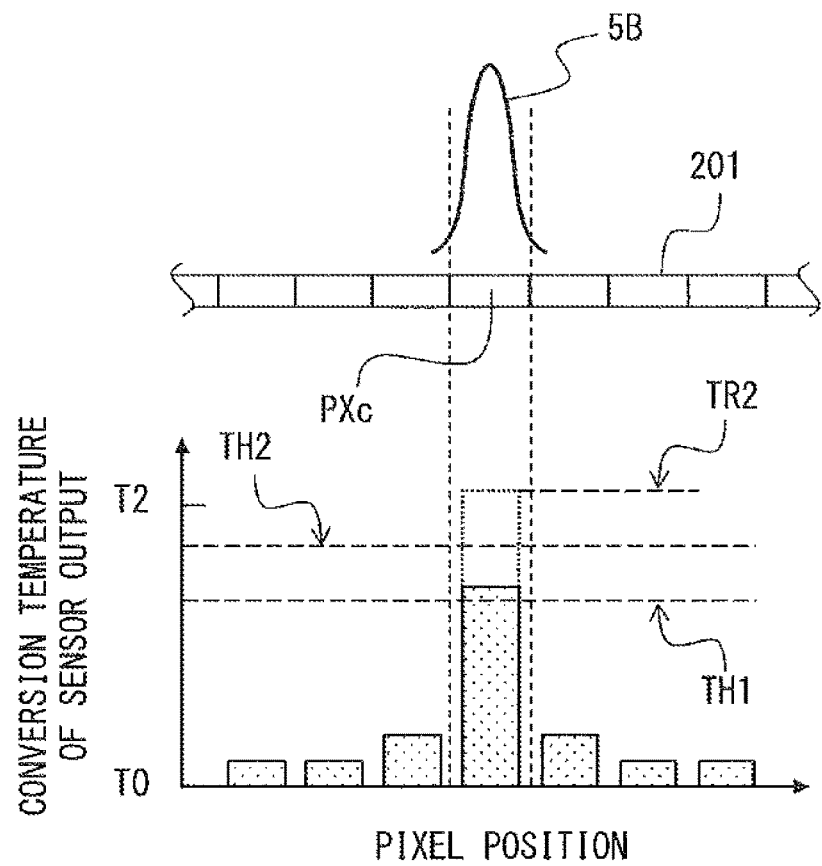
F I G. 15B

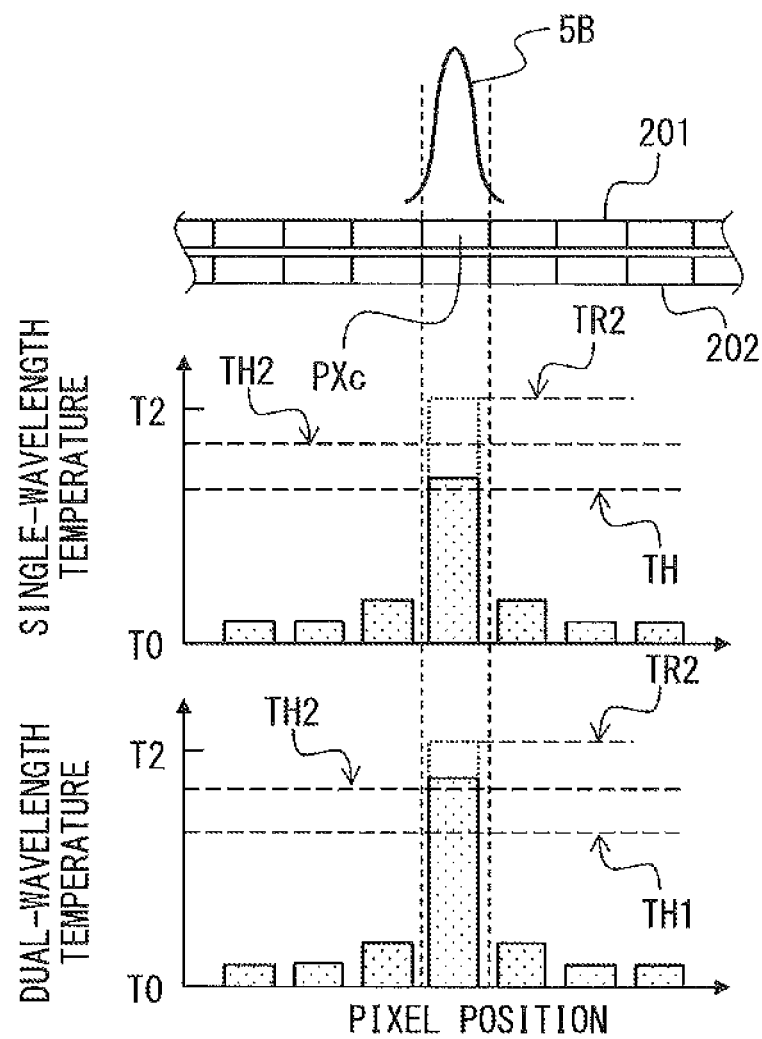
F I G. 16 B

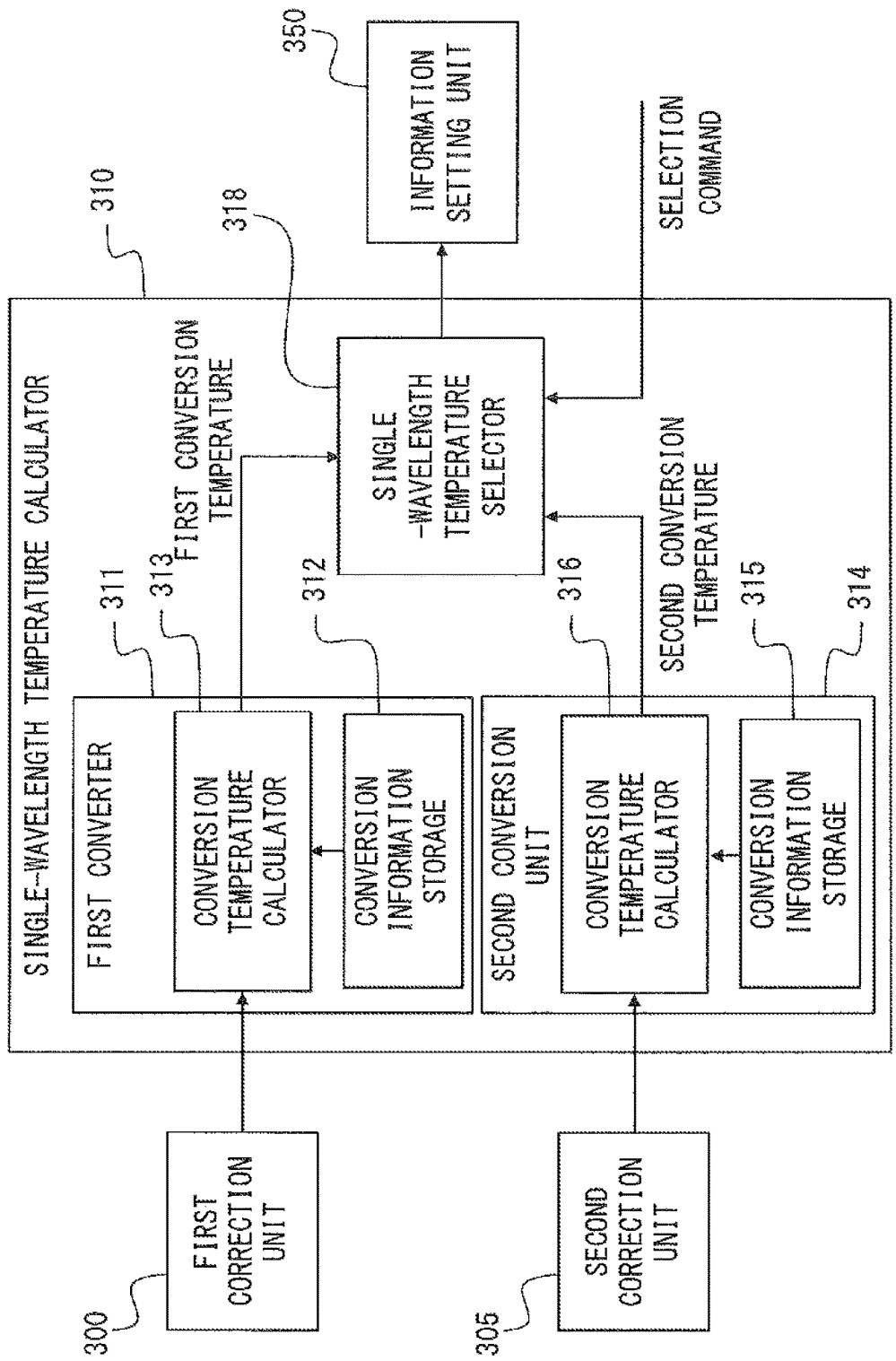
F I G. 17

HEAT SOURCE DETECTION DEVICE AND HEAT SOURCE DETECTION METHOD

CROSS-REFERENCE TO RELATED APPLICATION

This application is based upon and claims the benefit of priority of the prior Japanese Patent Application No. 2016-147852, filed on Jul. 27, 2016, the entire contents of which are incorporated herein by reference.

FIELD

The embodiments discussed herein are related to a heat source detection device.

BACKGROUND

A heat source detection device that detects a heat source in a prescribed detection area detects whether or not a heat source exists, the size of a heat source, etc. based on a temperature distribution in the detection area obtained by converting an electric output (sensor output) output from an infrared image sensor into a temperature. As a method of highly accurately measuring a temperature of a heat source in this type of heat source detection devices, a method is known that corrects a sensor output based on the sensitivity of each photodetector in an infrared image sensor so as to suppress differences in temperatures caused by variations in sensor outputs.

Also, a method is known in which intensity distributions of a plurality of types of infrared rays radiated from a subject (heat source) of different wavelength bands are detected so as to calculate a surface temperature of the subject based on the detected intensity distributions, and thereby the accuracy in measuring the surface temperature is improved. As a method of calculating a surface temperature of a subject based on intensity distributions of a plurality of types of infrared rays, a method is known in which intensity distributions of three types of infrared rays are detected so as to calculate the surface temperature by using a method referred to as a trichromatic colorimetry (see Document 1 for example). Also, as another method, a method is known in which a temperature of a subject is highly accurately measured based on a ratio between two different types of outputs of different wavelength bands output from an infrared image sensor (see Document 2 for example).

Document 1: Japanese Laid-open Patent Publication No. 2009-047611

Document 2: Japanese Laid-open Patent Publication No. 2004-085319

SUMMARY

According to an aspect of the embodiment, an apparatus includes a memory configured to store first conversion information representing a relationship between a first output output from an infrared sensor in accordance with an incident amount of infrared rays in a first infrared wavelength band and a temperature, second conversion information representing a relationship between a second output output from the infrared sensor in accordance with an incident amount of infrared rays in a second infrared wavelength band that is different from the first infrared wavelength band and a temperature, and third conversion information representing a relationship between a ratio between the first and second outputs and a temperature; and a processor configured to detect a heat source based on the first and second outputs output from the infrared sensor, the first conversion information, the second conversion information and the third conversion information stored in the memory. A process performed by the processor to detect the heat source includes: calculating, as a single-wavelength temperature, one of a first temperature obtained by converting the first output output from the infrared sensor into a temperature, a second temperature obtained by converting the second output output from the infrared sensor together with the first output into a temperature and an average value of the first and second temperatures, and calculating a dual-wavelength temperature obtained by converting the ratio between the first and second outputs into a temperature, and determining a temperature of the heat source based on the dual-wavelength temperature and determining a distance to the heat source from the infrared sensor based on a comparison result between the single-wavelength temperature and dual-wavelength temperature.

The object and advantages of the embodiment will be realized and attained by means of the elements and combinations particularly pointed out in the claims.

It is to be understood that both the foregoing general description and the following detailed description are exemplary and explanatory and are not restrictive of the embodiment.

BRIEF DESCRIPTION OF DRAWINGS

FIG. 3 illustrates a functional configuration of a heat source detection device in a heat source detection system according to the first embodiment;

FIG. 6 is a graph illustrating an example of conversion information that is referred to by the dual-wavelength temperature calculator;

FIG. 9 is a flowchart explaining the contents of a single-wavelength temperature calculation process according to the first embodiment;

FIG. 12 illustrates an example of a determination table used for determining whether or not there is a heat source and a distance to the heat source;

FIG. 13 explains a setting method of a correction coefficient;

FIG. 15A and FIG. 15B explain an example of a relationship between a heat source of a case when there is one sensor output and a conversion temperature;

FIG. 16A and FIG. 16B explain an example of a relationship between a heat source based on two sensor outputs in different wavelength bands and conversion temperature;

FIG. 17 illustrates a configuration of a single-wavelength temperature calculator in a heat source detection device of a second embodiment;

DESCRIPTION OF EMBODIMENTS

Preferred embodiments of the present invention will be explained with reference to accompanying drawings.

A sensor output from an infrared image sensor used for detecting a heat source can be obtained by using an optical system to image, on the light receiving surface of the infrared image sensor, infrared rays arriving at an infrared ray camera having an infrared image sensor from a detection area. In the above, when the heat source imaged on the light receiving surface of the infrared image sensor has roughly the same size as that of one pixel (photodetector) in the infrared image sensor, the infrared rays from the heat source leaks to the space around the pixel that imaged the heat source. Leaking of infrared rays from a heat source as described above, reduces the amount of infrared rays that is incident on a pixel that imaged the heat source from the heat source, resulting in a lower output from the sensor of the pixel. This leads to a possibility that a measurement temperature of a pixel based on a sensor output of the pixel that the heat source imaged will be lower than the actual temperature of the heat source, preventing accurate detection of the heat source. Hereinbelow, embodiments will be described for a heat source detection device and a method that can accurately detect a small heat source.

<First Embodiment>

Figure 1:
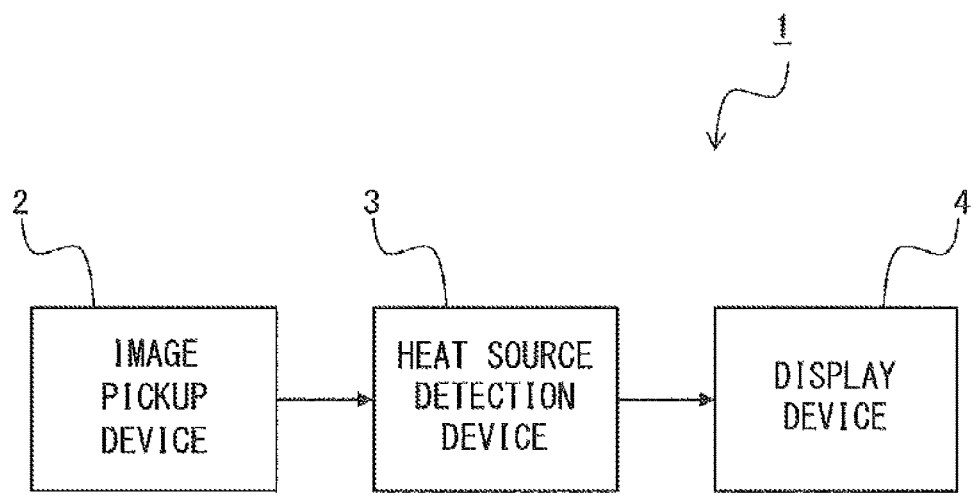
FIG. 1 illustrates a configuration of a heat source detection system according to a first embodiment.

FIG. 1 illustrates a configuration of a heat source detection system according to a first embodiment.

As illustrated in FIG. 1, a heat source detection system 1 includes an image pickup device 2, a heat source detection device 3, and a display device 4. The image pickup device 2 is a device that picks up an infrared image in a detection area. The heat source detection device 3 is a device that detects a heat source in a detection area based on an infrared image picked up by the image pickup device 2. The display device 4 is a device that displays a result of detection performed by the heat source detection device 3.

Figure 2:
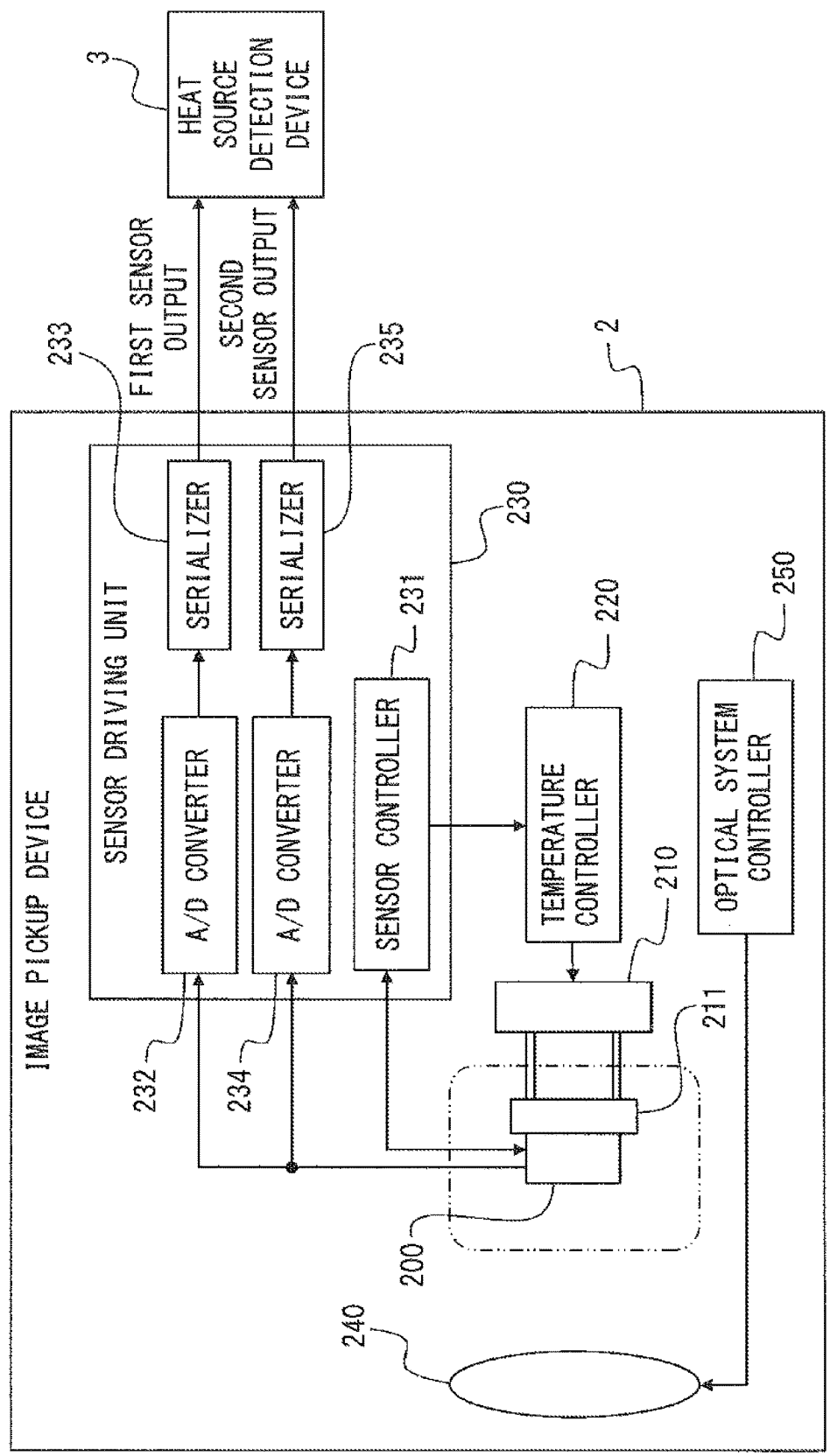
FIG. 2 illustrates a configuration example of an image pickup device in a heat source detection system according to the first embodiment.

FIG. 2 illustrates a configuration example of an image pickup device in a heat source detection system according to the first embodiment.

As illustrated in FIG. 2, the image pickup device 2 according to the present embodiment includes a dual-wavelength infrared image sensor (which will be referred to as a "dual-wavelength infrared sensor" hereinafter) 200, a cooler device 210, a temperature controller 220, a sensor driving unit 230, an optical system 240 and an optical system controller 250.

The dual-wavelength infrared sensor 200 is an infrared sensor that detects the amount of infrared rays of a first wavelength in an infrared wavelength band and the amount of infrared rays in a second wavelength band that is different from the first wavelength band in an infrared wavelength band. In the dual-wavelength infrared sensor 200, photodetectors having a first detection element that detects the amount of infrared rays in the first wavelength band and a second detection element that detects the amount of infrared rays in the second wavelength band are arranged in a 2D manner. For a photodetector of the dual-wavelength infrared sensor 200, a Quantum Well Infrared Photodetector (QWIP) for example is used, and it has an element layer structure in which two types of multi quantum well layers each having different well layer thicknesses and barrier layer compositions are stacked. The dual-wavelength infrared sensor 200 converts photo currents caused in the first and second detection elements in each photodetector respectively into voltage signals, sequentially selects output voltages from the respective pixels (photodetectors) so as to output them to the outside in a time series manner.

The cooler device 210 is a heat exchanger for making the dual-wavelength infrared sensor 200 operate in a prescribed temperature range (70k through 80k for example). The operations (or the amount of heat exchanged between the cooler device 210 and the dual-wavelength infrared sensor 200) of the cooler device 210 is controlled by the temperature controller 220. The dual-wavelength infrared sensor 200 and a heat exchange unit 211 of the cooler device 210 are accommodated in for example a vacuum container having an incident window for infrared signal light transmitted through the optical system 240.

The sensor driving unit 230 controls the driving status of the dual-wavelength infrared sensor 200 including the temperature of the dual-wavelength infrared sensor 200 and converts an analog signal output from the dual-wavelength infrared sensor 200 into a digital signal so as to output it to the heat source detection device 3. The sensor driving unit 230 includes a sensor controller 231, a first A/D converter 232, a first serializer 233, a second A/D converter 234 and a second serializer 235.

The sensor controller 231 applies, to the dual-wavelength infrared sensor 200, a timing pulse signal (such as a clock signal, a frame synchronization signal, a shifter register control signal, etc.) or a bias such as an amplifier power source, a reset voltage, an input gate voltage, etc. Also, the sensor controller 231 monitors the temperature of the dual-wavelength infrared sensor 200, and outputs a control signal to the temperature controller 220 so that the temperature of the dual-wavelength infrared sensor 200 is kept in a prescribed temperature range.

The first A/D converter 232 converts an analog signal output from each of the first detection elements in the dual-wavelength infrared sensor 200 into a digital signal and outputs it to the first serializer 233 as for example a 14-bit parallel signal. The first serializer 233 serializes a parallel signal output from the first A/D converter 232 so as to output it to the heat source detection device 3 as a time-series digital signal of one system. The second A/D converter 234 converts an analog signal output from each of the second detection elements in the dual-wavelength infrared sensor 200 into a digital signal and outputs it to the second serializer 235 as for example a 14-bit parallel signal. The second serializer 235 serializes a parallel signal output from the second A/D converter 234 so as to output it to the heat source detection device 3 as a time-series digital signal of one system. In the explanations below, a digital signal output from the first serializer 233 will be referred to as a first sensor output and a digital signal output from the second serializer 235 will be referred to as a second sensor output.

The optical system 240 images infrared rays arriving at the image pickup device 2 from the detection area on the incident surface of the dual-wavelength infrared sensor 200, and makes it incident on the first and second detection elements. The optical system 240 includes one or two or more infrared lenses that can change the distance from the light receiving surface of the dual-wavelength infrared sensor 200. The optical system controller 250 controls a positional relationship etc. between an infrared lens included in the optical system 240 and the dual-wavelength infrared sensor 200, and adjusts an detection area (image picks up scope) in which it is imaged on the incident surface of the dual-wavelength infrared sensor 200.

As described above, the image pickup device 2 according to the present embodiment uses the dual-wavelength infrared sensor 200 to simultaneously detect the amount of infrared rays in the first wavelength band and the amount of infrared rays in the second wavelength band as the amount of infrared rays in one detection area. In other words, image pickup device 2 picks up a first infrared image based on the amount of infrared rays in the first wavelength band and a second infrared image based on the amount of infrared rays in the second wavelength band as the infrared image in one detection area.

FIG. 3 illustrates a functional configuration of a heat source detection device in a heat source detection system according to the first embodiment.

As illustrated in FIG. 3, the heat source detection device 3 includes a first correction unit 300, a second correction unit 305, a single-wavelength temperature calculator 310, a dual-wavelength temperature calculator 330, an information setting unit 350 and a determination unit 360.

The first correction unit 300 corrects a first sensor output output from the image pickup device 2 based on the sensitivity characteristics respectively of the first detection elements in the dual-wavelength infrared sensor 200 of the image pickup device 2. The first correction unit 300 includes a correction coefficient storage 301 and a correction output calculator 302. The correction coefficient storage 301 stores a correction coefficient for a sensor output value that was set based on the sensitivity characteristic of each of the first detection elements. According to the correction coefficient of the correction coefficient storage 301, the correction output calculator 302 corrects an output value of each detection element in the first sensor output. In the explanations below, a sensor output corrected by the first correction unit 300 will be referred to as a first correction output. Note that a value of a first correction output may be the same as that of the first sensor output that was input to the first correction unit 300.

The second correction unit 305 corrects a second sensor output output from the image pickup device 2, based on the sensitivity characteristic of each of the second detection elements in the dual-wavelength infrared sensor 200 of the image pickup device 2. The second correction unit 305 includes a correction coefficient storage 306 and a correction output calculator 307. The correction coefficient storage 306 has stored a correction coefficient for a sensor output value set based on the sensitivity characteristic of each of the second detection elements. The correction output calculator 307 corrects an output value of each detection element in the second sensor output based on a correction coefficient of the correction coefficient storage 306. In the explanations below, a second sensor output corrected by the second correction unit 305 will be referred to as a second correction output. Note that a value of a second correction output may be the same as that of the second sensor output that was input to the second correction unit 305.

According to a value obtained by converting a correction output in one wavelength band into a temperature, the single-wavelength temperature calculator 310 calculates a temperature distribution in the detection area. The single-wavelength temperature calculator 310 according to the present embodiment calculates an average value of a conversion temperature of a first correction output and a conversion temperature of a second correction output, as the temperature distribution in the detection area.

The dual-wavelength temperature calculator 330 converts a ratio between the first and second correction outputs into a temperature so as to calculate the temperature distribution in the detection area.

According to a first temperature distribution calculated by the single-wavelength temperature calculator 310 and a second temperature distribution calculated by the dual-wavelength temperature calculator 330, the information setting unit 350 sets information on a heat source including the temperature of the heat source, whether or not the heat source exists and a distance to the heat source. In the explanations below, a first temperature distribution calculated by the single-wavelength temperature calculator 310 will also be referred to as a single-wavelength temperature and a second temperature distribution calculated by the dual-wavelength temperature calculator 330 will also be referred to as a dual-wavelength temperature.

The determination unit 360 determines a detection result of a heat source based on information on a heat source set by the information setting unit 350. The determination unit 360 outputs a detection result of a heat source to the display device 4.

Figure 4:
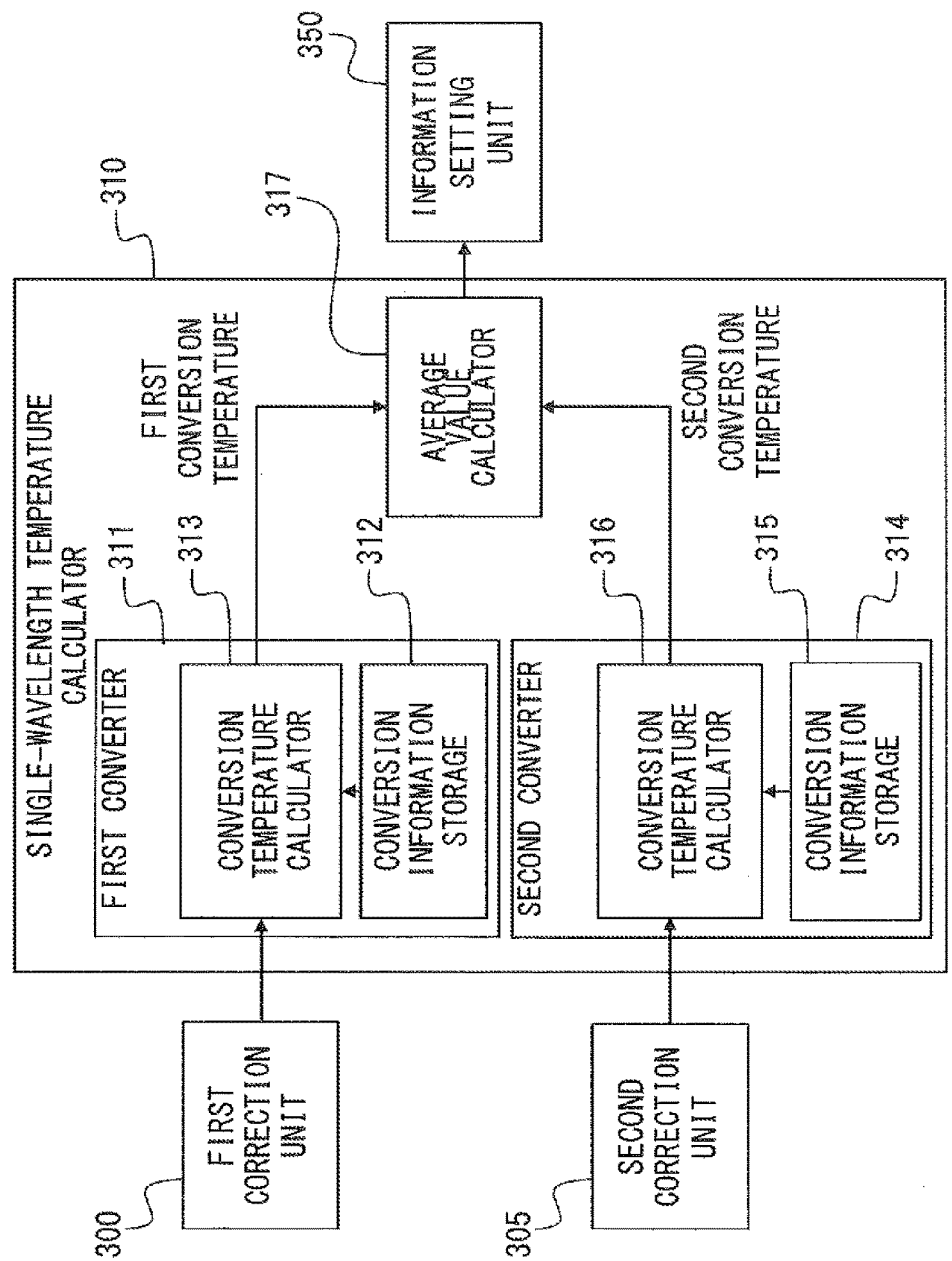
FIG. 4 illustrates a configuration of a single-wavelength temperature calculator in a heat source detection device according to the first embodiment.

FIG. 4 illustrates a configuration of a single-wavelength temperature calculator in a heat source detection device according to the first embodiment.

As illustrated in FIG. 4, the single-wavelength temperature calculator 310 in the heat source detection device 3 in the present embodiment includes a first converter 311, a second converter 314 and an average value calculator unit 317.

The first converter 311 converts an output value of each detection element in the first correction output corrected by the first correction unit 300 into a temperature. The first converter 311 includes a conversion information storage 312 and a conversion temperature calculator 313. The conversion information storage 312 has stored conversion information representing a correspondence relationship between a sensor output value and a temperature in the first detection element. The conversion temperature calculator 313 refers to conversion information of the conversion information storage 312 so as to calculate a conversion temperature of the first correction output (first conversion temperature).

The second converter 314 converts an output value of each detection element in the second correction output into a temperature. The second converter 314 includes a conversion information storage 315 and a conversion temperature calculator 316. The conversion information storage 315 has stored conversion information that represents a correspondence relationship between a sensor output value and a temperature in the second detection element. The conversion temperature calculator 316 refers to conversion information of the conversion information storage 315 so as to calculate a conversion temperature of the second correction output (second conversion temperature).

The average value calculator 317 calculates an average value of a first conversion temperature and a second conversion temperature. The average value calculator 317 calculates average value $\{(Ta+Tb)/2\}$ between conversion temperature Ta of the first detection element in the first conversion temperature and conversion temperature Tb of the second detection element in the second conversion temperature for each pixel (for each photodetector) of the dual-wavelength infrared sensor 200. The average value calculator 317 outputs a calculated average value of the conversion temperatures to the information setting unit 350 as a single-wavelength temperature.

Figure 5:
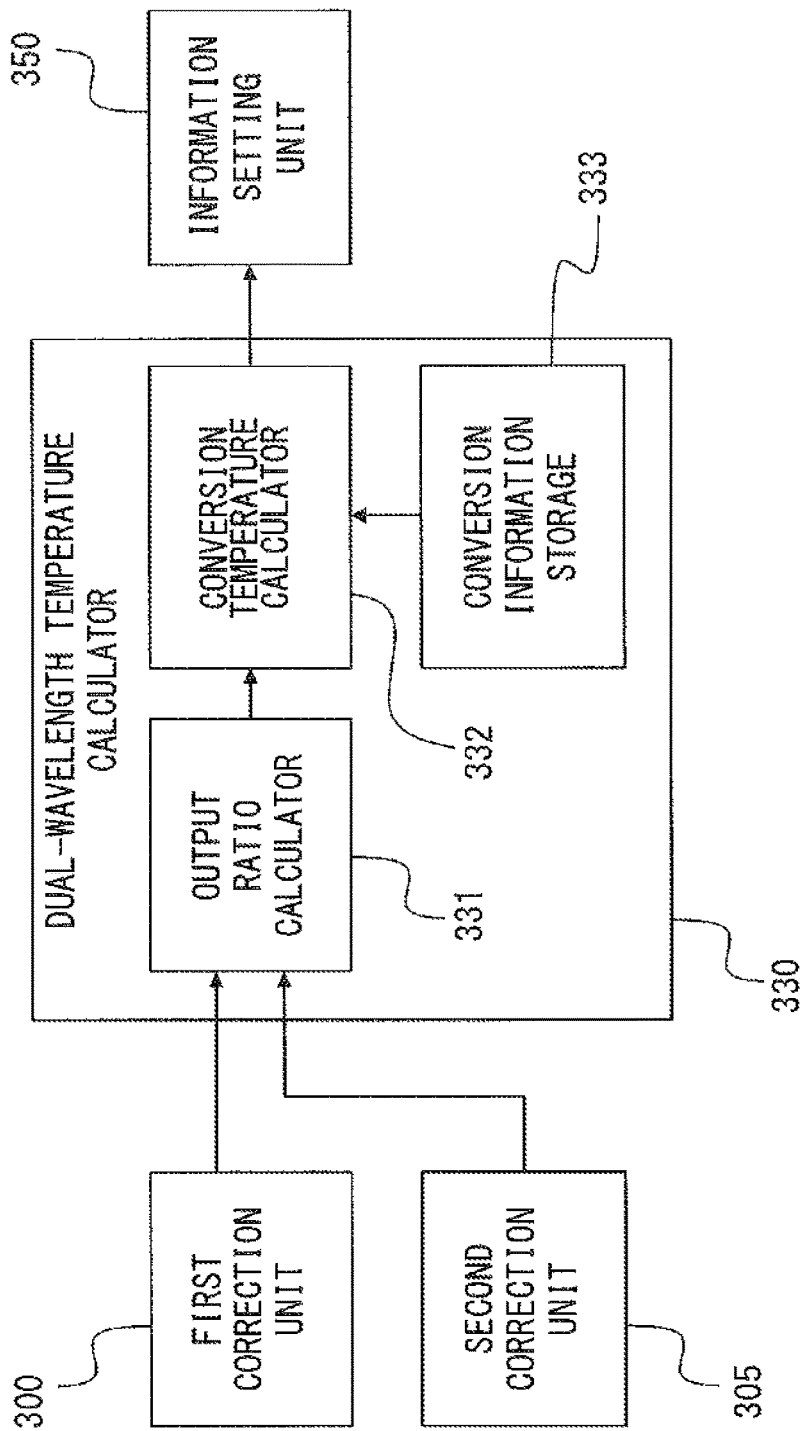
FIG. 5 illustrates a configuration of a dual-wavelength temperature calculator in a heat source detection device according to the first embodiment.

FIG. 5 illustrates a configuration of a dual-wavelength temperature calculator in a heat source detection device according to the first embodiment. FIG. 6 is a graph illustrating an example of conversion information that is referred to by the dual-wavelength temperature calculator.

As illustrated in FIG. 5, the dual-wavelength temperature calculator 330 in the heat source detection device 3 of the present embodiment includes an output ratio calculator 331, a conversion temperature calculator 332 and a conversion information storage 333.

The output ratio calculator 331 calculates an output ratio between the first and second correction outputs. The output ratio calculator 331 calculates ratio (output ratio) Qa/Qb between output value Qa of the first detection element in the first correction output and output value Qb of the second detection element in the second correction output for each pixel (for each photodetector) of the dual-wavelength infrared sensor 200.

According to output ratio Qa/Qb calculated by the output ratio calculator 331 and conversion information stored in the conversion information storage 333, the conversion temperature calculator 332 calculates a conversion temperature for each pixel (for each photodetector) of the dual-wavelength infrared sensor 200. The conversion information storage 333 has stored conversion information for example as illustrated as graph 8 of FIG. 6. The conversion temperature calculator 332 outputs a calculated conversion temperature to the determination unit 360 as a dual-wavelength temperature.

Graph 8 of FIG. 6 has the horizontal axis representing a temperature (Celsius) of a heat source and the vertical axis representing a light amount ratio Qa/Qb of the black-body radiation. Note that in light amount ratio Qa/Qb of the black-body radiation, Qa is the black-body radiation amount from the heat source of infrared rays with the wavelengths of 3 through 5 μm, and Qb is the black-body radiation amount from the heat source of infrared rays with the wavelengths of 8 through 10 μm. As illustrated in FIG. 6, there is a relationship of 1 to 1 between the temperature of the heat source and light amount ratio Qa/Qb of the black-body radiation. Thus, finding light amount ratio Q of the black-body radiation from the heat source will make it possible to convert light amount ratio Q into temperature TQ of the heat source based on the conversion information illustrated in FIG. 6. Note that conversion information is not limited to the relationship illustrated in FIG. 6, and can be set appropriately based on output ratio Qa/Qb and a temperature of the heat source in the dual-wavelength infrared sensor 200 used for the image pickup device 2.

Figure 7:
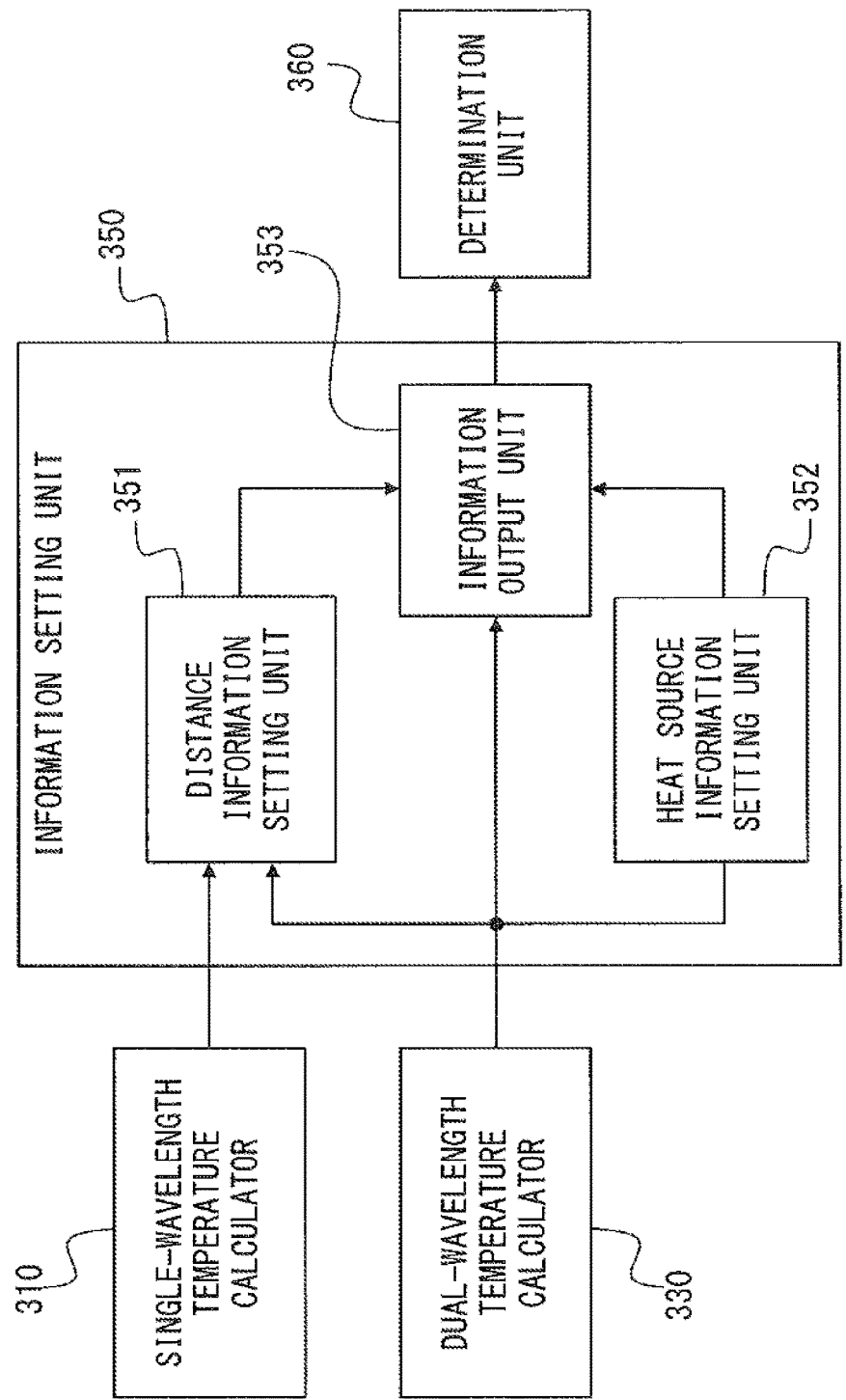
FIG. 7 illustrates a configuration of an information setting unit in a heat source detection device according to the first embodiment.

FIG. 7 illustrates a configuration of an information setting unit in a heat source detection device according to the first embodiment.

As illustrated in FIG. 7, the information setting unit 350 in the heat source detection device 3 of the present embodiment includes a distance information setting unit 351, a heat source information setting unit 352 and an information output unit 353.

According to a single-wavelength temperature calculated by the single-wavelength temperature calculator 310 and a dual-wavelength temperature calculated by the dual-wavelength temperature calculator 330, the distance information setting unit 351 determines whether a distance to the heat source is a short distance or a long distance, and sets a value (distance information value) that represents a distance to the heat source. For example, the distance information setting unit 351 sets a distance information value based on the absolute value of the difference between a single-wavelength temperature and a dual-wavelength temperature. In the present embodiment, when the absolute value of the difference is equal to or smaller than a prescribed threshold, the distance information setting unit 351 determines that a distance to the heat source is a short distance and sets the distance information value to "0". When the absolute value of the difference is greater than the prescribed threshold, the distance information setting unit 351 determines that a distance to the heat source is a long distance and sets the distance information value to "1".

According to a dual-wavelength temperature calculated by the dual-wavelength temperature calculator 330, the heat source information setting unit 352 determines whether or not the detection area has a heat source of a higher temperature than a prescribed temperature, and sets a value representing the determination result (heat source information value). For example, when the dual-wavelength temperature is higher than a prescribed threshold, the heat source information setting unit 352 determines that the detection area has a heat source of a higher temperature, and sets the heat source information value to "1". When the dual-wavelength temperature is equal to or smaller than the prescribed threshold, the heat source information setting unit 352 determines that the detection area does not have a heat source of a higher temperature, and sets the heat source information value to "0".

The information output unit 353 integrates the distance information value set by the distance information setting unit 351, the value set by the heat source information setting unit 352 and the dual-wavelength temperature so as to output the result to the determination unit 360.

Figure 8:
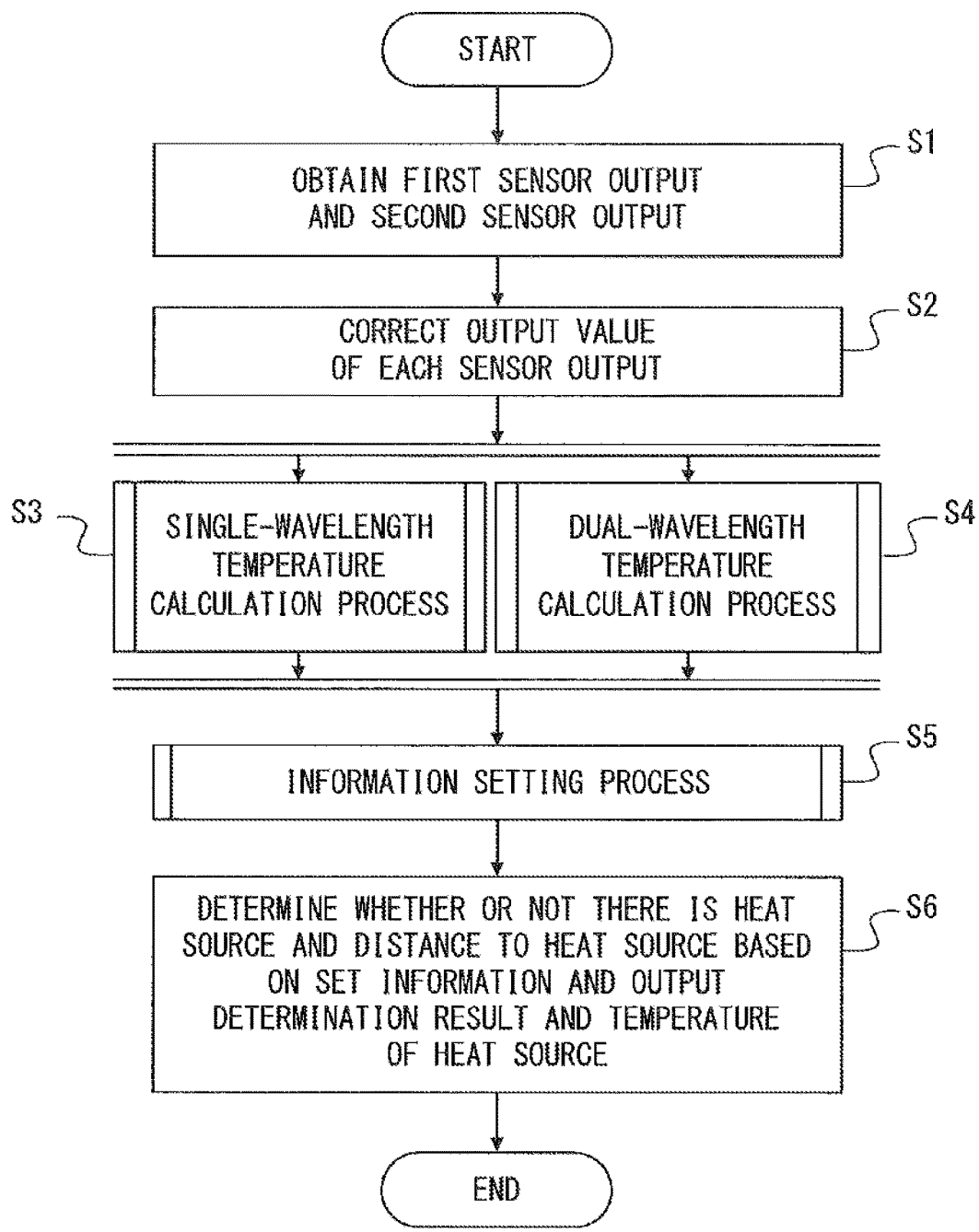
FIG. 8 is a flowchart explaining a heat source detection process according to the first embodiment.

FIG. 8 is a flowchart explaining a heat source detection process according to the first embodiment.

After starting the operation, the heat source detection device 3 of the present embodiment repeats the processes in step S1 through step S6 illustrated in FIG. 8 at prescribed time intervals.

The heat source detection device 3 first obtains first and second sensor outputs (step S1). In step S1, the heat source detection device 3 obtains the first sensor output (sensor output of the first wavelength band) output from the image pickup device 2 and the second sensor output (sensor output of the second wavelength band). The heat source detection device 3 inputs the obtained first sensor output to the first correction unit 300 and inputs the obtained second sensor output to the second correction unit 305.

Next, the heat source detection device 3 corrects an output value of each sensor output (step S2). The process in step S2 is performed by the first correction unit 300 and the second correction unit 305. The first correction unit 300 refers to a correction coefficient of the correction coefficient storage 301 so as to correct the first sensor output, and outputs the corrected first sensor output (first correction output) to the single-wavelength temperature calculator 310 and the dual-wavelength temperature calculator 330. The second correction unit 305 refers to a correction coefficient of the correction coefficient storage 306 so as to correct the second sensor output, and outputs the corrected second sensor output (second correction output) to the single-wavelength temperature calculator 310 and the dual-wavelength temperature calculator 330.

Next, the heat source detection device 3 performs a single-wavelength temperature calculation process (step S3) and a dual-wavelength temperature calculation process (step S4). In this example, a pair of double lines in FIG. 8 means that the processes in step S3 and step S4 are performed in parallel.

The single-wavelength temperature calculation process is performed by the single-wavelength temperature calculator 310. The single-wavelength temperature calculator 310 calculates, as the single-wavelength temperature, an average value between the conversion temperature of the first correction output calculated based on the first correction output and the conversion information and a conversion temperature of a second correction output calculated based on the second correction output and the conversion information. The conversion temperature of the first correction output is calculated by the first converter 311. The conversion temperature of the second correction output is calculated by the second converter 314. The average value of the conversion temperatures is calculated by the average value calculator 317. The single-wavelength temperature calculator 310 outputs the calculated conversion temperature average value to the information setting unit 350 as a single-wavelength temperature.

Meanwhile, the dual-wavelength temperature calculation process is performed by the dual-wavelength temperature calculator 330. The dual-wavelength temperature calculator 330 calculates an output ratio between the first correction output and the second correction output so as to calculate a dual-wavelength temperature based on the calculated output ratio and the conversion information (see FIG. 6). The output ratio of correction outputs is calculated by the output ratio calculator 331. The dual-wavelength temperature is calculated by the conversion temperature calculator 332. The dual-wavelength temperature calculator 330 inputs the calculated dual-wavelength temperature to the information setting unit 350.

The process in step S4 may be performed after the process in step S3 or the process in step S3 may be performed after the process in step S4.

Next, the heat source detection device 3 performs an information setting process (step S5). The information setting process is performed by the information setting unit 350. The information setting unit 350 sets a distance information value representing a distance to the heat source based on the single-wavelength temperature and the dual-wavelength temperature, and extracts heat source information value representing whether or not there is a high-temperature heat source based on the dual-wavelength temperature. The information setting unit 350 outputs the set information and the dual-wavelength temperature to the determination unit 360.

Next, the heat source detection device 3 determines whether or not there is a heat source and a distance to the heat source based on the set information, and outputs the determination result and the temperature of the heat source (step S6). The process in step S6 is performed by the determination unit 360. The determination unit 360 determines whether or not the detection area has a high-temperature heat source that is to be reported and whether a distance to the heat source to be reported is a short distance or a long distance, based on the distance information value representing a distance to the heat source and the heat source information value representing whether or not there is a high-temperature heat source. Thereafter, the determination unit 360 outputs the determination result and the temperature of the heat source (dual-wavelength temperature) to the display device 4 etc.

FIG. 9 is a flowchart explaining the contents of a single-wavelength temperature calculation process according to the first embodiment.

The single-wavelength temperature calculation process (step S3) in the above process is performed by the single-wavelength temperature calculator 310. The single-wavelength temperature calculator 310 according to the present embodiment performs the processes instep S301 through step S304 illustrated in FIG. 9 as a single-wavelength temperature calculation process.

The single-wavelength temperature calculator 310 first calculates a first conversion temperature based on a first correction output (corrected first sensor output) and conversion information (step S301). The process in step S301 is performed by the first converter 311.

The single-wavelength temperature calculator 310 next calculates a second conversion temperature based on a second correction output (corrected second sensor output) and conversion information (step S302). The process in step S302 is performed by the second converter 314.

The processes in step S301 and step S302 may be performed in parallel, or the process in step S301 may be performed after the process in step S302.

Next, the single-wavelength temperature calculator 310 calculates an average value between the first and second conversion temperatures (step S303). The process instep S303 is performed by the average value calculator 317. The average value calculator 317 calculates an average value between a conversion temperature converted based on an sensor output of the first detection element and a conversion temperature converted based on an sensor output of the second detection element, for each pair of pixels (photodetectors) of the dual-wavelength infrared sensor 200.

After the process in step S303, the single-wavelength temperature calculator 310 outputs the average value calculated by the average value calculator 317 to the information setting unit 350 as a single-wavelength temperature (step S304). After the process in step S304, the single-wavelength temperature calculator 310 terminates the single-wavelength calculation process that uses one pair of the first and second correction outputs.

Figure 10:
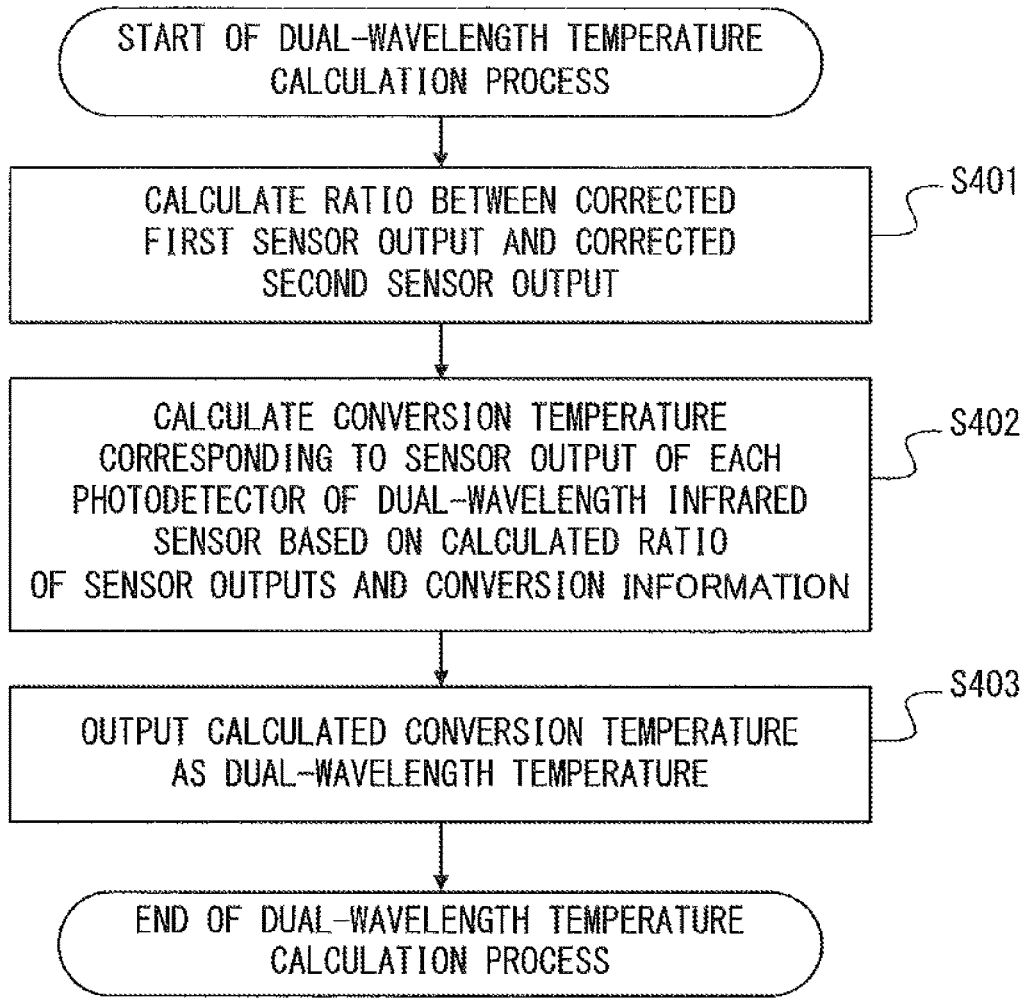
FIG. 10 is a flowchart explaining the contents of a dual-wavelength temperature calculation process according to the first embodiment.

FIG. 10 is a flowchart explaining the contents of a dual-wavelength temperature calculation process according to the first embodiment.

The dual-wavelength temperature calculation process (step S4) in the above process is performed by the dual-wavelength temperature calculator 330. The dual-wavelength temperature calculator 330 performs the processes in step S401 through step S403 illustrated in FIG. 10 as a dual-wavelength temperature calculation process.

The dual-wavelength temperature calculator 330 first calculates a ratio between the first correction output (corrected first sensor output) and the second correction output (corrected second sensor output) (step S401). The process in step S401 is performed by the output ratio calculator 331. The output ratio calculator 331 calculates ratio Qa/Qb between first correction output Qa and second correction output Qb for each pixel (each photodetector) of the dual-wavelength infrared sensor 200.

Next, the dual-wavelength temperature calculator 330 calculates a conversion temperature corresponding to a sensor output of each photodetector in the dual-wavelength infrared sensor 200 based on the calculated output ratio and the conversion information of the conversion information storage 333 (step S402). Step S402 is performed by the conversion temperature calculator 332. The conversion temperature calculator 332 calculates a conversion temperature corresponding to a sensor output of each photodetector pixel in the dual-wavelength infrared sensor 200 based on output ratio Qa/Qb calculated in step S401 and conversion information (see FIG. 6) of the conversion information storage 333.

After the process in step S402, the dual-wavelength temperature calculator 330 outputs the conversion temperature calculated by the conversion temperature calculator 332 to the information setting unit 350 as the dual-wavelength temperature (step S403). After the process in step S403, the dual-wavelength temperature calculator 330 terminates the dual-wavelength calculation process that uses one pair of the first and second correction outputs.

Figure 11:
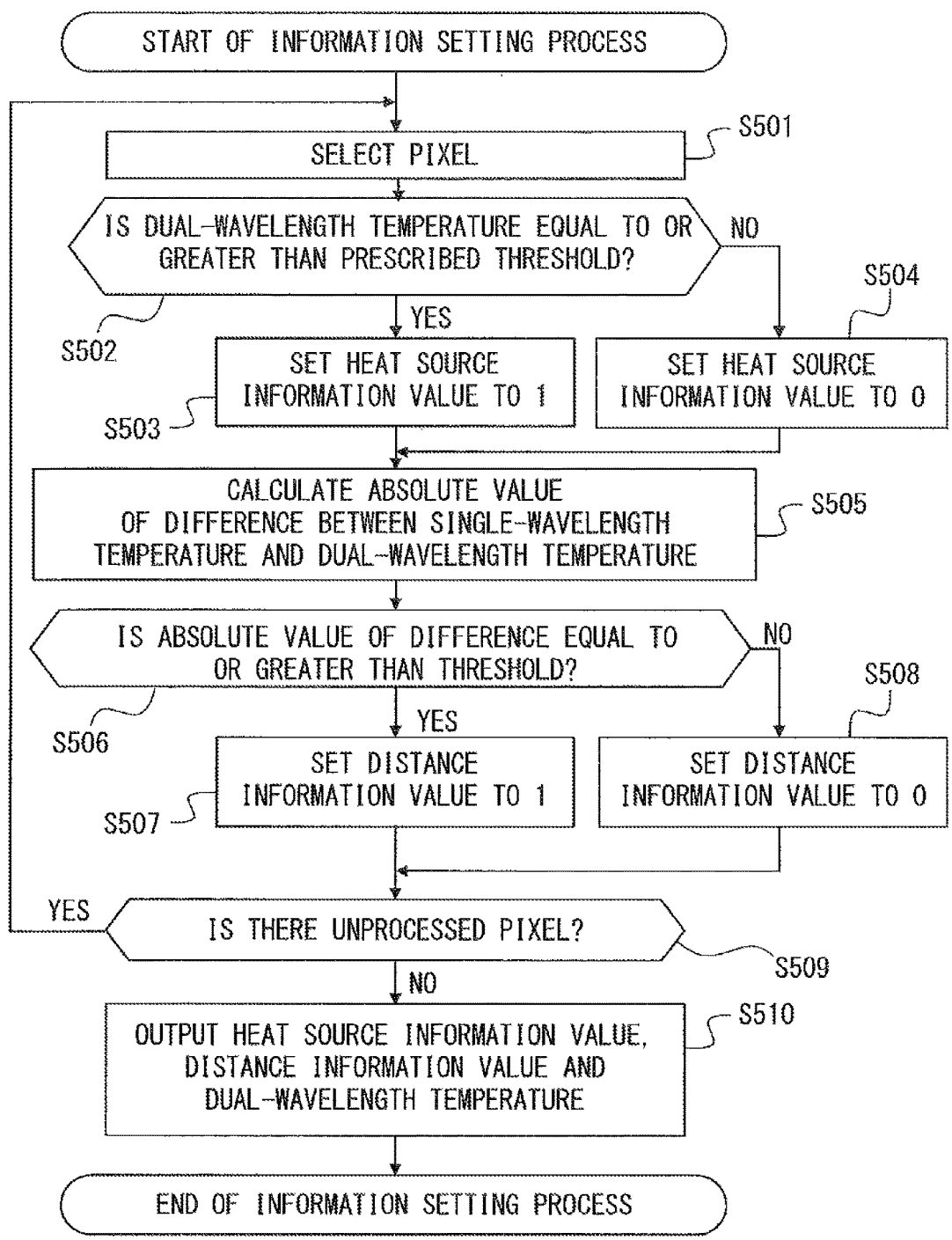
FIG. 11 is a flowchart explaining the contents of an information setting process according to the first embodiment.

FIG. 11 is a flowchart explaining the contents of an information setting process according to the first embodiment.

The information setting process (step S5) in the above process is performed by the information setting unit 350. The information setting unit 350 performs the processes in step S501 through step S510 illustrated in FIG. 11 as an information setting process.

The information setting unit 350 first selects a pixel as a process target (step S501). Step S501 is performed by the distance information setting unit 351 and the heat source information setting unit 352. In step S501, the distance information setting unit 351 for example selects a pixel as a process target and reports the selected pixel to the heat source information setting unit 352, and thereby both of them select a common pixel. A pixel selected in step S501 is one photodetector in the dual-wavelength infrared sensor 200.

Next, the information setting unit 350 determines whether or not the dual-wavelength temperature of the selected pixel is equal to or greater than a threshold (step S502). Step S502 is performed by the heat source information setting unit 352. When the dual-wavelength temperature is equal to or greater than a prescribed threshold (YES in step S502), the heat source information setting unit 352 sets the heat source information value of the selected pixel to a value representing the detection of a high-temperature heat source (for example "1") (step S503). When the dual-wavelength temperature is smaller than the threshold (NO in step S502), the heat source information setting unit 352 sets the heat source information value of the selected pixel to a value representing that a high-temperature heat source has not been detected (for example "0") (step S504).

After step S503 or step S504, the information setting unit 350 calculates the absolute value of a difference between the single-wavelength temperature and the dual-wavelength temperature of the selected pixel (step S505) so as to determine whether or not the absolute value of a difference is equal to or greater than a threshold (step S506). The processes in step S505 and step S506 are performed by the distance information setting unit 351. When the calculated absolute value of a difference is equal to or greater than the threshold (YES in step S506), the distance information setting unit 351 sets the distance information value of the selected pixel to a value representing that the distance to the heat source is a long distance ("1" for example) (step S507). When the calculated absolute value of a difference is smaller than the threshold (NO in step S506), the distance information setting unit 351 sets the distance information value of the selected pixel to a value representing that the distance to the heat source is a short distance ("0" for example) (step S508).

After step S507 or step S508, the information setting unit 350 determines whether or not there is an unprocessed pixel (step S509). When there is an unprocessed pixel (YES in step S509), the information setting unit 350 repeats the processes in step S501 through step S509. When there is no unprocessed pixel, i.e., when the process has been performed on all the pixels (NO in step S509), the information setting unit 350 integrates the heat source information value, the distance information value and the dual-wavelength temperature so as to output it to the determination unit 360 (step S510). The process in step S510 is performed by the information output unit 353. After the process in step S510, the information setting unit 350 terminates the information setting process that uses a pair of the single-wavelength temperature and the dual-wavelength temperature.

Note that the flowchart illustrated in FIG. 11 is an example of a process that the information setting unit 350 performs. The information setting unit 350 may perform the process in step S502 through step S504 after the processes in step S505 through step S508. Further, the information setting unit 350 may perform the processes in step S502 through step S504 and the processes in step S505 through step S508 in parallel. When the processes in step S502 through 504 and the processes in step S505 through 508 are performed in parallel, the selection order of pixels in the processes in step S502 through 504 and the selection order of pixels in the processes in step S505 through 508 may be different.

FIG. 12 illustrates an example of a determination table used for determining whether or not there is a heat source and a distance to the heat source.

The determination unit 360 determines whether or not there is a high-temperature heat source in for example a watching angle of each pixel and whether a distance to a high-temperature heat source is a short distance or a long distance when there is a high-temperature heat source, based on a heat source information value and a distance information value set for each pixel (for each photodetector) of the dual-wavelength infrared sensor 200. Then, the determination unit 360 performs the above determination by for example referring to a determination table 361 as illustrated in FIG. 12.

In the flowchart illustrated in FIG. 11, a heat source information value of a pixel having a dual-wavelength temperature equal to or greater than a threshold is set to "1" and a heat source information value of a pixel having a dual-wavelength temperature smaller than a threshold is set to "0". A high-temperature heat source does not exist in a watching angle of a pixel having a dual-wavelength temperature that is smaller than a threshold. Accordingly, when a heat source information value of a pixel as a determination target is "0", the determination unit 360 determines that there is not a high-temperature heat source in a watching angle of that pixel regardless of the distance information value, in accordance with the determination table 361 illustrated in FIG. 12.

Meanwhile, there is a high-temperature heat source in a watching angle of a pixel having a dual-wavelength temperature that is equal to or greater than a threshold. In such a case, the determination unit 360 determines, in accordance with the determination table 361, whether a distance to the heat source is a short distance or a long distance based on the distance information value.

In the flowchart illustrated in FIG. 11, a distance information value of a pixel having an absolute value of a difference between the single-wavelength temperature and the dual-wavelength temperature that is equal to or greater than a threshold is set to "1" and distance information value of a pixel having an absolute value of a difference is smaller than a threshold is set to "0". An absolute value of a difference between a single-wavelength temperature and a dual-wavelength temperature has a tendency to become greater with an increasing distance to a high-temperature heat source. Accordingly, when the heat source information value of a pixel as a determination target is "1" and the distance information value is "0", the determination unit 360 determines that there is a high-temperature heat source in a watching angle of the pixel and the distance to the heat source is a short distance as in the determination table 361. When the heat source information value of a pixel as a determination target is "1" and the distance information value is "1", the determination unit 360 determines that there is a high-temperature heat source in a watching angle of the pixel and the distance to the heat source is a long distance as in the determination table 361.

The determination unit 360, after the above determination, generates for example an infrared image in the detection area based on the dual-wavelength temperature of each pixel so as to make the display device 4 display a pixel having a heat source in the watching angle in an emphasized manner.

FIG. 13 explains a setting method of a correction coefficient.

In one dual-wavelength infrared sensor 200, the sensor sensitivities (or relationship between an amount of incident infrared rays and sensor output) vary between first detection elements in the respective photodetectors. For example, as illustrated in FIG. 13, when infrared rays 5 are evenly incident on an infrared sensor 201 in which one pixel (photodetector) PX only has a first detection element, sensor output values vary from respective pixel PXs. Similarly, in one dual-wavelength infrared sensor 200, the sensor sensitivities vary also between second detection elements in the respective photodetectors. Accordingly, in the heat source detection device 3, a correction coefficient is set based on a sensor sensitivity of a first detection element and a sensor sensitivity of a second detection element in each photodetector of the dual-wavelength infrared sensor 200 used in combination with the heat source detection device 3, and each sensor output is corrected in accordance with that correction coefficient.

When a correction coefficient is set based on a sensor sensitivity of a first detection element, for example infrared rays at temperature Ta are evenly incident on each photodetector of a dual-wavelength infrared sensor and the sensor output of each of the first detection elements like the bar graph illustrated in the upper portion of FIG. 13 is obtained. Next, infrared rays of temperature Tb (<Ta) for example are evenly incident on each photodetector of the dual-wavelength infrared sensor 200 and the sensor output of each of the first detection element is obtained like the bar graph illustrated in the middle portion of FIG. 13.

Thereafter, based on the theoretical sensor output in a case when infrared rays at temperatures Ta and Tb are evenly incident on each photodetector of the dual-wavelength infrared sensor 200 and the actual sensor output, a correction coefficient for the sensor output of each detection element that results in a constant value for the sensor outputs of the detection elements is calculated. In other words, the correction coefficient for the sensor output of first detection elements is a value that results in constant value Q (Ta) in a case when infrared rays at temperature Ta are incident. Similarly, the correction coefficient for the sensor output of second detection elements is a value that results inconstant value Q (Tb) in a case when infrared rays at temperature Tb are incident. A correction coefficient is calculated in accordance with a known calculation method in an infrared image sensor (calibration method of sensor output). A calculated correction coefficient for a first sensor output is stored in the correction coefficient storage unit 301 of the first correction unit 300 in the heat source detection device 3.

Also, in the heat source detection system of the present embodiment, a correction coefficient for a sensor output of a second detection element in each photodetector is calculated in a similar calculation and is stored in the correction coefficient storage 306 of the second correction unit 305 in the heat source detection device 3.

Hereinafter, by referring to FIG. 14 through FIG. 16, explanations will be given for an operation effect of a heat source detection system of the present embodiment.

Figure 14:
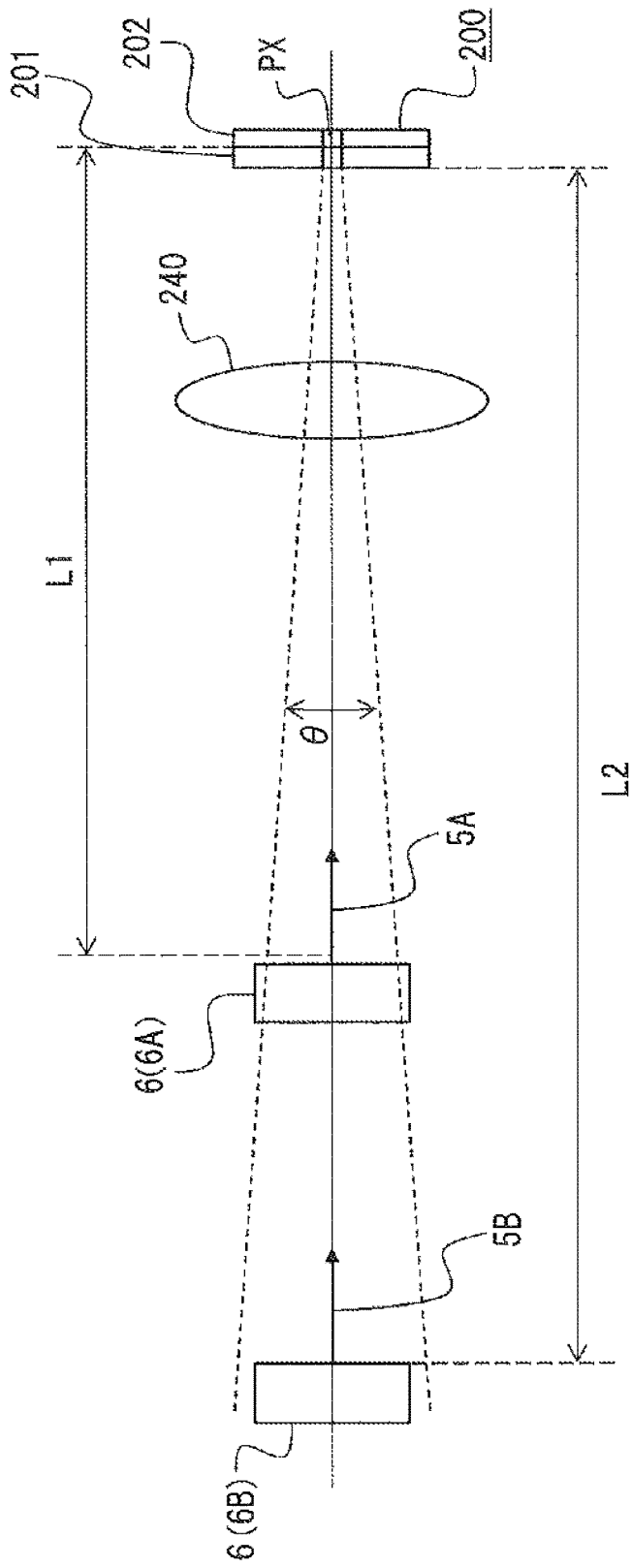
FIG. 14 illustrates an example of a relationship between a heat source size and a distance to the heat source.
Figure 15A:
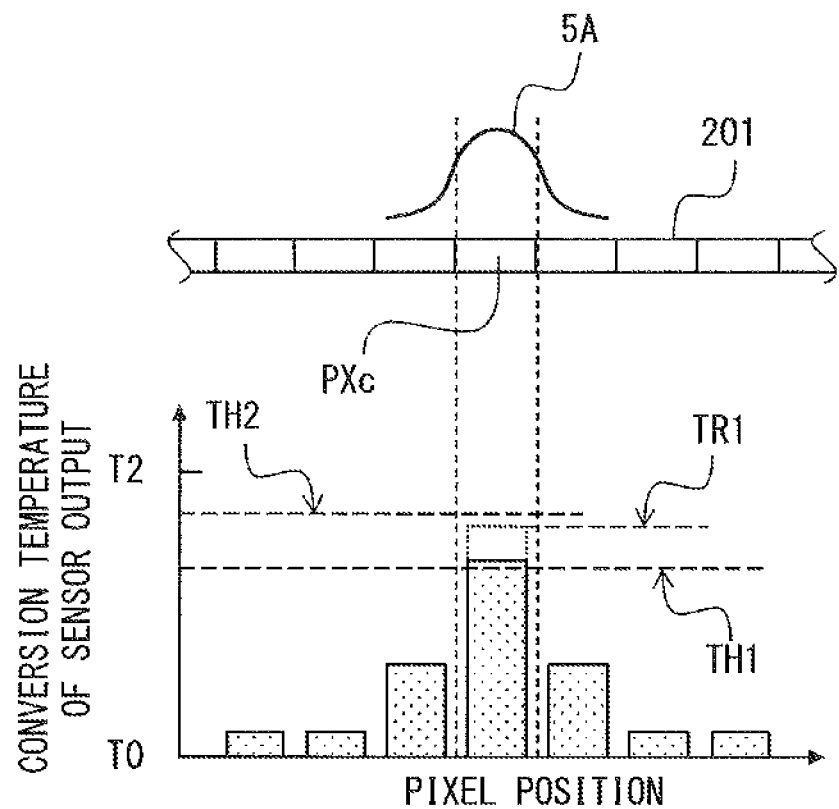
Figure 16A:
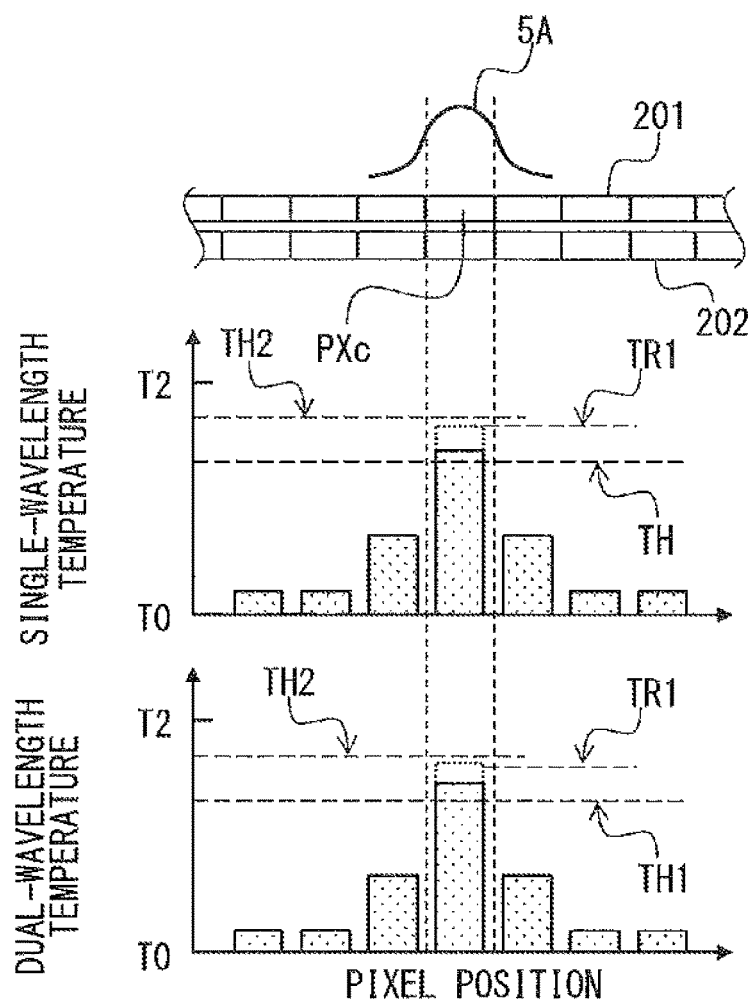

FIG. 14 illustrates an example of a relationship between a heat source size and a distance to the heat source. FIG. 15A and FIG. 15B explain an example of a relationship between a heat source of a case when there is one sensor output and a conversion temperature. FIG. 16A and FIG. 16B explain an example of a relationship between a heat source based on two sensor outputs in different wavelength bands and conversion temperature.

The heat source detection system 1 of the present embodiment can detect a heat source when the heat source imaged on the incident surface of the dual-wavelength infrared sensor 200 via the optical system 240 is in a size of about one pixel. In other words, in the heat source detection system 1 of the present embodiment, as illustrated in FIG. 14 for example, a heat source in a size substantially equal to the area equivalent to watching angle θ of that pixel PX in the dual-wavelength infrared sensor 200.

However, as in the heat source 6A located at a position of distance L1 from the incident surface of the dual-wavelength infrared sensor 200, when the size of the heat source 6A seen from pixel PX is greater than the area equivalent to watching angle θ of pixel PX, the heat source 6A imaged on the incident surface becomes greater than one pixel. In such a case, as illustrated in FIG. 15A, infrared rays 5A leak to other pixels adjacent to pixel PXc on which the heat source 6A was imaged. Thus, a temperature obtained by converting a sensor output of pixel PXc on which the heat source was imaged in the infrared sensor 201 is lower than a temperature obtained by converting a sensor output of a case when all the infrared rays 5A from the heat source are incident on that pixel (actual temperature TR1 of the heat source).

Also, as in the heat source 6B located at a position of distance L2 (>L1) from the incident surface of the dual-wavelength infrared sensor 200, when the size of the heat source 6B seen from pixel PX is smaller than the area equivalent to watching angle θ of pixel PX, the heat source 6B imaged on the incident surface becomes smaller than one pixel. In such a case, as illustrated in FIG. 15B, infrared rays 5B incident on pixel PXc on which the heat source 6B was imaged concentrate on the center portion of that pixel PXc. At that moment, the sensor output of pixel PXc on which the heat source 6B was imaged becomes a sensor output obtained by averaging the optical response output in the center portion of that pixel PX (detection element) and the optical response output in the peripheral portion of that pixel. Thus, a temperature obtained by converting a sensor output of pixel PXc on which the heat source was imaged in the infrared sensor 201 is a value lower than a conversion temperature of a sensor output of a case when infrared rays are evenly incident on the entire pixel from the heat source (actual temperature TR2 of the heat source). Further, when the imaged heat source 6 is smaller than one pixel and the heat source is located at a long distance, a difference between a temperature of the heat source converted based on a sensor output and actual temperature TR2 becomes greater than a difference of a case when the imaged heat source 6 is slightly larger than one pixel and the heat source is located at a short distance. This applies to both a temperature of a heat source converted based on a first sensor output output from the dual-wavelength infrared sensor 200 and a temperature of a heat source converted based on a second sensor output.

Further, depending upon a temperature of the heat source 6, as illustrated in FIG. 15A and FIG. 15B, a case when the heat source is located at a long distance and a case when the heat source is located at a short distance have substantially the same temperature obtained by converting sensor output. In such a case, it is difficult to estimate a distance to the heat source based on a conversion temperature converted based on a sensor output. As illustrated in FIG. 15A, when a temperature converted based on a sensor output and actual temperature TR1 of an heat source is between first threshold TH1 for determining a heat source and a second threshold TH2 for determining a high-temperature heat source, it is possible to detect that there is a heat source that does not have a high temperature. However, as illustrated in FIG. 15B, when a conversion temperature of a sensor output is between first and second thresholds TH1 and TH2 and actual temperature TR2 of the heat source is greater than second threshold TH2, a conversion temperature of a sensor output alone will lead to a situation where a high-temperature heat source is detected as a heat source not having a high temperature.

By contrast, the heat source detection device 3 of the present embodiment determines (estimates) whether a distance to a heat source is a short distance or a long distance based on a temperature converted based on a sensor output and a temperature converted based on a ratio of sensor outputs.

In the heat source detection device 3 of the present embodiment, in the single-wavelength temperature calculator 310, an average value of a first conversion temperature obtained by converting a first correction output into a temperature and a second conversion temperature obtained by converting a second correction output into a temperature is calculated (step S301 and step S302). When the heat source imaged on the incident surface of the infrared sensor 201 is slightly larger than one pixel and is located at a short distance, first and second conversion temperatures have tendencies that are similar to the distributions illustrated in FIG. 15A, whereas the temperatures in pixel PXc that imaged the heat source are slightly different. Thus, a conversion temperature in pixel PXc on which the heat source was imaged at an average value (first single-wavelength temperature) between first and second conversion temperatures is a value slightly lower than actual temperature TR1 of the heat source as illustrated in FIG. 16A.

Also, in the heat source detection device 3 of the present embodiment, in the dual-wavelength temperature calculator 330, an output ratio between first and second correction outputs is calculated so as to calculate a dual-wavelength temperature converted based on a relationship between the and a temperature of a heat source. In such a case, first and second correction outputs in pixel PXc on which the heat source was imaged have tendencies similar to the distributions illustrated in FIG. 15A, whereas they are slightly different in the temperatures in pixel PXc on which the heat source was imaged. Accordingly, when the imaged heat source is slightly larger than one pixel and the heat source is located at a short distance, a dual-wavelength temperature converted based on an output ratio between first and second correction outputs is a value that is substantially the same as a single-wavelength temperature obtained by converting an sensor output as illustrated in FIG. 16A.

By contract, single-wavelength temperatures (an average value of conversion temperatures) of a case when the imaged heat source is smaller than one pixel and the heat source is located at a long distance and a dual-wavelength temperature (conversion temperature of output ratio) are as illustrated in FIG. 16B. First and second correction outputs of a case when the imaged heat source is smaller than one pixel and the heat source is located at a long distance are averaged respectively in pixels. This results in a value lower than sensor output TR2 of a case when infrared rays are evenly incident on the entire pixel from the heat source and the difference thereof is great. Thus, when the heat source imaged on the incident surface of the infrared sensors 201 and 202 is smaller than one pixel and the heat source is located at a long distance, a single-wavelength temperature in pixel PXc on which the heat source was imaged (average value of conversion temperatures) has a great difference from actual temperature TR2 of the heat source. Thus, when the projection area of the heat source is smaller than one pixel and the heat source is located at a long distance, the average value of conversion temperatures in a pixel on which the heat source is imaged is sometimes substantially the same as the average value of the conversion temperatures of a case when the projection area of the heat source is slightly larger than one pixel and the heat source is at a short distance.

However, first and second correction outputs respectively drop at similar ratios. Thus, as illustrated in FIG. 16B, in a dual-wavelength temperature obtained by converting a ratio between first and second correction outputs (conversion temperature of output ratio), the temperature of a pixel in which the heat source is imaged becomes higher than a conversion temperature in a single-wavelength temperature, becoming closer to the actual temperature of the heat source. Thus, when the projection area of the heat source is smaller than one pixel and the heat source is located at a long distance, an absolute value of a difference between a single-wavelength temperature obtained by converting a sensor output and a dual-wavelength temperature obtained by converting an ratio between sensor outputs become greater. The heat source detection system 1 of the present embodiment determines whether a distance to the heat source is a short distance or a long distance based on an absolute value of a difference between a single-wavelength temperature and a dual-wavelength temperature. Further, the heat source detection system 1 of the present embodiment determines whether the heat source has a high temperature based on a dual-wavelength temperature by utilizing a fact that a dual-wavelength temperature is closer to actual temperatures TR1 and TR2 of the heat source than is a single-wavelength temperature. As described above, determining whether or not the heat source has a high temperature based on a dual-wavelength temperature that is closer to actual temperature TR2 makes it possible to prevent a situation where a temperature of a high-temperature heat source located at a long distance is detected as a low temperature as illustrated in FIG. 16B.

In the present embodiment, there are three detection results in the determination unit 360; a case when a high-temperature heat source is not detected, a case when a high-temperature heat source is located at a short distance, and a case when the high-temperature heat source is located at a long distance. However, the determination unit 360 is not limited to this, and can determine for example the size of the heat source, a temperature, a distance to the heat source, etc. in more detail. Also, instead of performing more detailed determination in the determination unit 360, an analysis unit may be provided to the heat source detection device 3 for performing an analysis of for example the size of the heat source, a temperature, a distance to the heat source, etc.

Also, the present embodiment determines that there is a high-temperature heat source in the detection area when a dual-wavelength temperature is equal to or greater than a threshold. However, the determination unit 360 is not limited to this, and may determine that there is a low-temperature heat source that is to be reported in the detection area when a dual-wavelength temperature is smaller than a threshold so as to output a determination result.

Further, the image pickup device 2 in the heat source detection system of the present embodiment may be a device in which the cooler device 210 and the temperature controller 220 illustrated in FIG. 2 for example are omitted.

<Second Embodiment>

In the present embodiment, explanations will be given for the heat source detection device 3 and a heat source detection method that make it possible to select a single-wavelength temperature output from the single-wavelength temperature calculator 310 from one of the single-wavelength temperature, the dual-wavelength temperature and the average value of conversion temperature. The heat source detection system 1 of the present embodiment includes the image pickup device 2, the heat source detection device 3 and the display device 4 as illustrated in FIG. 1. The image pickup device 2 includes the dual-wavelength infrared sensor 200 and outputs an sensor output in a first wavelength band and a sensor output in a second wavelength band in a infrared wavelength band as described in the first embodiment. Also, as described in the first embodiment, the heat source detection device 3 includes the first correction unit 300, the second correction unit 305, the single-wavelength temperature calculator 310, the dual-wavelength temperature calculator 330, the information setting unit 350 and the determination unit 360. However, the single-wavelength temperature calculator 310 of the heat source detection device 3 of the present embodiment has a configuration as illustrated in FIG. 17.

FIG. 17 illustrates a configuration of a single-wavelength temperature calculator in a heat source detection device of the second embodiment.

As illustrated in FIG. 17, the single-wavelength temperature calculator 310 of the present embodiment includes the first converter 311, the second converter 314, and a single-wavelength temperature selector 318. The first converter 311 includes the conversion information storage 312 and the conversion temperature calculator 313 so as to convert an sensor output in a first wavelength band corrected by the first correction unit 300 (first correction output) into a temperature. The second converter 314 includes the conversion information storage 315 and the conversion temperature calculator 316 so as to convert an sensor output in a second wavelength band corrected by the second correction unit 305 (second correction output) into a temperature.

The single-wavelength temperature selector 318 selects, as a single-wavelength temperature, one of a first conversion temperature converted by the first converter 311, a second conversion temperature converted by the second converter 314 and an average value of the first and second conversion temperatures. The single-wavelength temperature selector 318 selects a single-wavelength temperature in accordance with a selection command input from a selection information input unit (not illustrated). When an average value of first and second conversion temperatures is selected as a single-wavelength temperature, the single-wavelength temperature selector 318 calculates a single-wavelength temperature by performing a similar process to that of the average value calculator 317 described in the first embodiment. The single-wavelength temperature selector 318 outputs a selected single-wavelength temperature to the information setting unit 350.

The heat source detection device 3 of the present embodiment performs the processes in step S1 through step S6 illustrated in FIG. 8 as a heat source detection process. Among them, the processes in step S1, step S2 and step S4 through step S6 may be as described in the first embodiment respectively. The heat source detection device 3 of the present embodiment performs the process illustrated in FIG. 18 as the process in step S3 (single-wavelength temperature calculation process).

Figure 18:
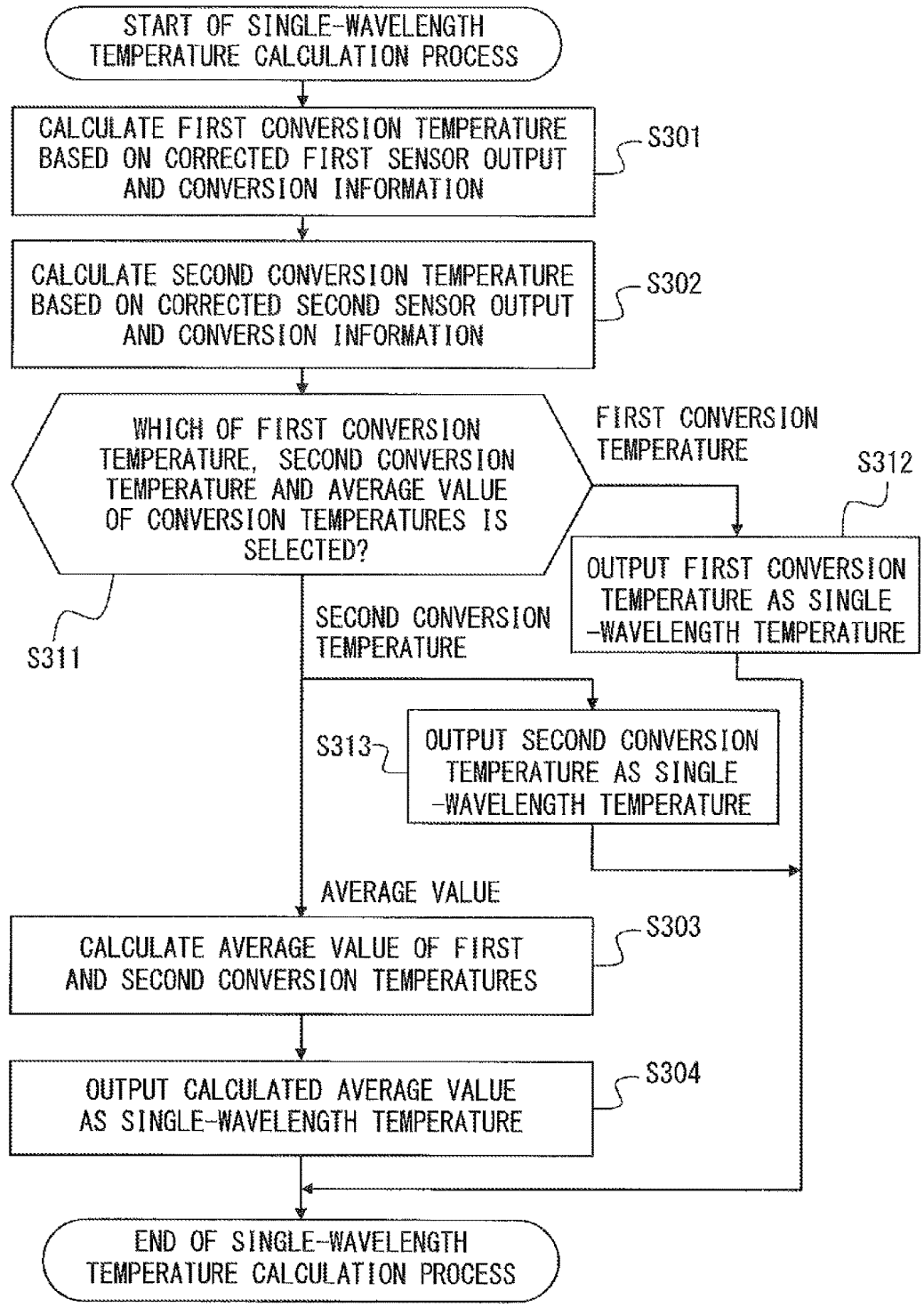
FIG. 18 is a flowchart explaining the contents of a single-wavelength temperature calculation process of the second embodiment.

FIG. 18 is a flowchart explaining the contents of a single-wavelength temperature calculation process of the second embodiment. Note that in the flowchart illustrated in FIG. 18, the same processes as those explained in the first embodiment are denoted by the same step numbers (such as step S301, step S302) as those denoting the steps in FIG. 8.

The single-wavelength temperature calculation process in FIG. 18 is performed by the single-wavelength temperature calculator 310. The single-wavelength temperature calculator 310 first calculates a first conversion temperature based on a corrected first sensor output and conversion information (step S301), and calculates a second conversion temperature based on a corrected second sensor output and conversion information (step S302). The process in step S301 is performed by the first converter 311 and the process in step S302 is performed by the second converter 314. Note that the processes in step S301 and step S302 may be performed in the reverse order or may be performed in parallel.

Next, the single-wavelength temperature calculator 310 determines which of a command to select a first conversion temperature, a command to select a second conversion temperature and a command to select an average value of conversion temperatures the input selection command is (step S311). The determination in step S311 is performed by the single-wavelength temperature selector 318.

When the selection command is a command to select an average value of conversion temperatures (step S311; average value), the single-wavelength temperature selector 318 calculates an average value of first and second conversion temperatures (step S303). Thereafter, the single-wavelength temperature selector 318 outputs the calculated average value of conversion temperatures to the information setting unit 350 as a single-wavelength temperature (step S304).

When the selection command is a command to select a first conversion temperature (step S311; first conversion temperature), the single-wavelength temperature selector 318 outputs a first conversion temperature to the information setting unit 350 as a single-wavelength temperature (step S312). Also, the selection command is a command to select a second conversion temperature (step S311; second conversion temperature), the single-wavelength temperature selector 318 outputs a second conversion temperature to the information setting unit 350 as a single-wavelength temperature (step S313).

After outputting a single-wavelength temperature to the information setting unit 350 in one of step S304, step S312 and step S313, the single-wavelength temperature calculator 310 terminates a single-wavelength temperature calculation process based on a pair of first and second correction outputs.

As described above, present embodiment detects a heat source using one of a first conversion temperature, a second conversion temperature and an average value of first and second conversion temperature as a single-wavelength temperature. This makes it possible to reduce the computation amount in a single-wavelength calculation process by treating a first or second conversion temperature as a single-wavelength temperature.

Note that the single-wavelength temperature calculator 310 according to the present embodiment may treat one of first and second conversion temperatures as a single-wavelength temperature. In such a case, the single-wavelength temperature selector 318 limits a selection command that can be input to the single-wavelength temperature selector 318 to two types of first and second conversion temperatures, and outputs a first or second conversion temperature in accordance with a selection command. When one of first and second conversion temperatures is treated as a single-wavelength temperature, the single-wavelength temperature calculator 310 may employ for example a configuration as illustrated in FIG. 19.

Figure 19:
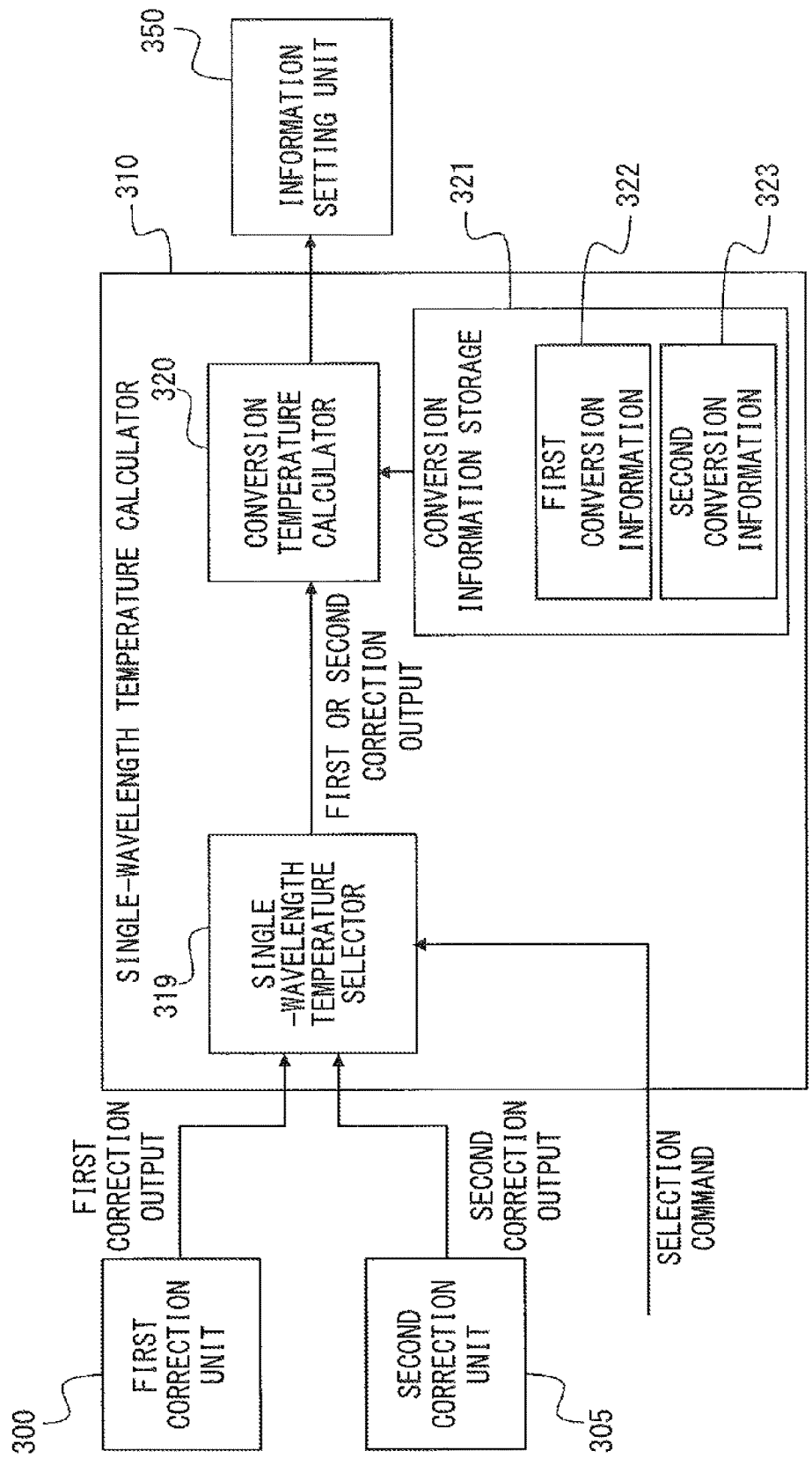
FIG. 19 illustrates a variation example of a single-wavelength temperature calculator according to the second embodiment.

FIG. 19 illustrates a variation example of a single-wavelength temperature calculator according to the second embodiment.

As illustrated in FIG. 19, the single-wavelength temperature calculator 310 that treats one of first and second conversion temperature as a single-wavelength temperature includes a single-wavelength temperature selector 319, a conversion temperature calculator 320 and a conversion information storage 321. The single-wavelength temperature selector 319, in accordance with a selection command input form an selection information input unit (not illustrated), selects which of first and second conversion temperatures to treat as a single-wavelength temperature. The single-wavelength temperature selector 319 outputs, to the conversion temperature calculator 320, only a correction output used for calculating a selected single-wavelength temperature (conversion temperature) from among first and second correction outputs corrected by the first correction unit 300 and the second correction unit 305, respectively. The conversion temperature calculator 320 refers to first conversion information 322 or second conversion information 323 stored in the conversion information storage 321 so as to convert a correction output selected by the single-wavelength temperature selector 319 into a temperature. The first conversion information 322 stored in the conversion information storage 321 is information including a correspondence relationship between a first correction output and a temperature. The second conversion information 323 stored in the conversion information storage 321 is information including a correspondence relationship between a second correction output and a temperature. The conversion temperature calculator 320 outputs a calculated first or second conversion temperature to the information setting unit 350 as a single-wavelength temperature.

Figure 20:
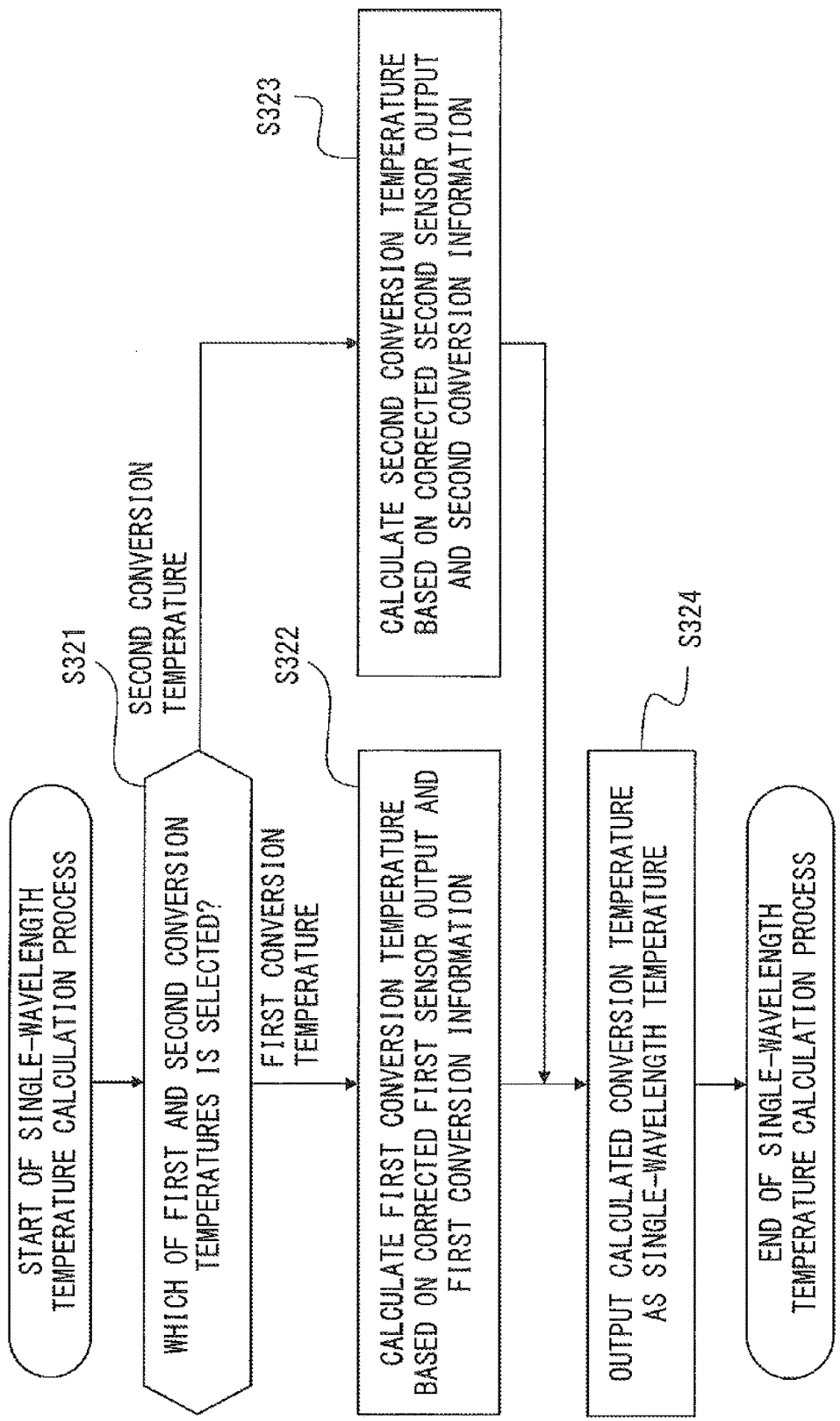
FIG. 20 is a flowchart explaining a variation example of a single-wavelength temperature calculation process according to the second embodiment.

The single-wavelength temperature calculator 310 illustrated in FIG. 19 performs the process illustrated in FIG. 20 for example as a single-wavelength temperature calculation process (step S3).

FIG. 20 is a flowchart explaining a variation example of a single-wavelength temperature calculation process according to the second embodiment.

In the single-wavelength temperature calculator 310 according to the variation example, it is first determined which of first and second conversion temperatures an input selection command selects (step S321). The determination in step S321 is performed by the single-wavelength temperature selector 319.

When the selection command is a command to select a first conversion temperature (step S321; first conversion temperature), the single-wavelength temperature selector 319 outputs to the conversion temperature calculator 320 information representing a conversion of a corrected first sensor output (first correction output) and a first correction output. In such a case, the single-wavelength temperature selector 319 next calculates a first conversion temperature based on a first correction output and first conversion information 322 (step S322). The process in step S322 is performed by the conversion temperature calculator 320 by referring to the first conversion information 322 of the conversion information storage 321.

When the selection command is a command to select a second conversion temperature (step S321; second conversion temperature), the single-wavelength temperature selector 319 outputs to the conversion temperature calculator 320 information representing a conversion of a corrected second sensor output (second correction output) and a second correction output. In such a case, the single-wavelength temperature selector 319 next calculates a second conversion temperature based on a second correction output and the second conversion information 323 (step S323). The process in step S323 is performed by the conversion temperature calculator 320 by referring to the second conversion information 323 of the conversion information storage 321.

After the process in step S322 or step S323, the conversion temperature calculator 320 outputs a calculated conversion temperature to the information setting unit 350 as a single-wavelength temperature (step S324). After the process in step S324, the single-wavelength temperature calculator 310 terminates a single-wavelength temperature calculation process based on a pair of first and second correction outputs.

As described above, by selecting which of first and second conversion temperatures is to be treated as a single-wavelength temperature and calculating only the selected conversion temperature, it is possible to reduce the computation amount in a single-wavelength temperature calculation process.

<Third Embodiment>

In the present embodiment, explanations will be given for the heat source detection device 3 and a heat source detection method that make possible to select a conversion temperature output from the information setting unit 350 from one of the single-wavelength temperature and the dual-wavelength temperature. The heat source detection system 1 of the present embodiment includes the image pickup device 2, the heat source detection device 3 and the display device 4 as illustrated in FIG. 1. The image pickup device 2 includes the dual-wavelength infrared sensor 200 and outputs an sensor output in a first wavelength band and a sensor output in a second wavelength band in an infrared wavelength band as described in the first embodiment. Also, as described in the first embodiment, the heat source detection device 3 includes the first correction unit 300, the second correction unit 305, the single-wavelength temperature calculator 310, the dual-wavelength temperature calculator 330, the information setting unit 350 and the determination unit 360. However, the information setting unit 350 of the heat source detection device 3 of the present embodiment has a configuration as illustrated in FIG. 21.

Figure 21:
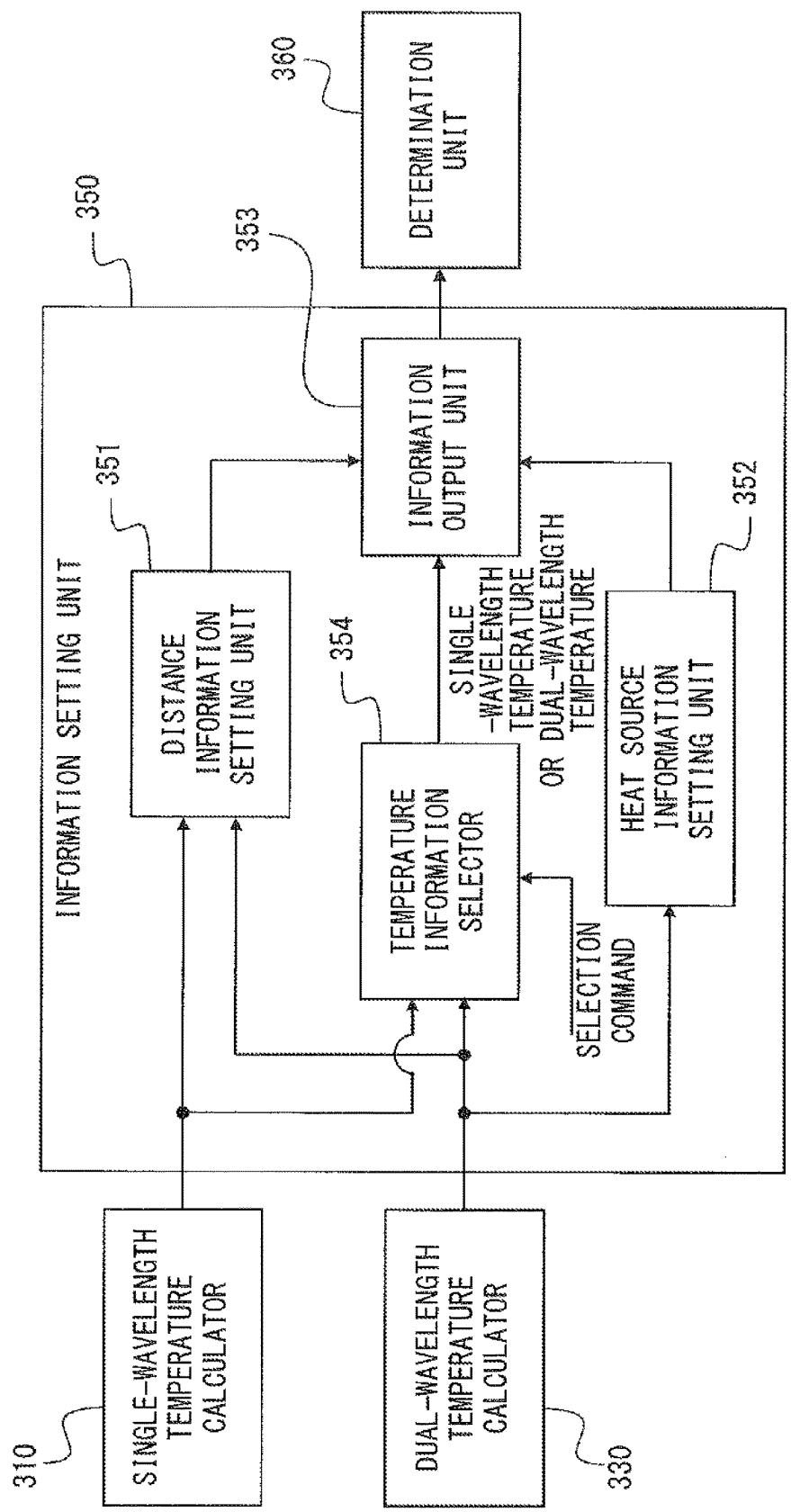
FIG. 21 illustrates a configuration of an information setting unit in a heat source detection device of a third embodiment.

FIG. 21 illustrates a configuration of an information setting unit in a heat source detection device of the third embodiment.

As illustrated in FIG. 21, the information setting unit 350 of the present embodiment includes the distance information setting unit 351, the heat source information setting unit 352, a temperature information selector 354 and the information output unit 353.

The distance information setting unit 351, based on a single-wavelength temperature calculated by the single-wavelength temperature calculator 310 and a dual-wavelength temperature calculated by the dual-wavelength temperature calculator 330, determines whether a distance to the heat source is a short distance or a long distance, and sets a distance information value that represents a distance to the heat source. For example, the distance information setting unit 351, based on an absolute value of a difference between a single-wavelength temperature and a dual-wavelength temperature, sets a distance information value. In the present embodiment, when an absolute value of the difference is equal to or smaller than a prescribed threshold, the distance information setting unit 351 determines the distance to the heat source to be a short distance to set a distance information value to "0". Also, when an absolute value of the difference is greater than a prescribed threshold, the distance information setting unit 351 determines the distance to the heat source to be a long distance to set a distance information value to "1".

According to a dual-wavelength temperature calculated by the dual-wavelength temperature calculator 330, the heat source information setting unit 352 determines whether or not the detection area has a heat source having a higher temperature than prescribed temperature, and sets a heat source information value representing a determination result. When for example the dual-wavelength temperature is higher than a prescribed threshold, the heat source information setting unit 352 determines that the detection area has a high-temperature heat source, and sets the heat source information value to "1". When the dual-wavelength temperature is equal to or smaller than a prescribed threshold, the heat source information setting unit 352 determines that the detection area does not have a high-temperature heat source, and sets the heat source information value to "0".

In accordance with a selection command input from a selection information input unit (not illustrated), the temperature information selector 354 selects one of the single-wavelength temperature and the dual-wavelength temperature as information to be output as information representing a conversion temperature based on the sensor output of the dual-wavelength infrared sensor 200.

The information output unit 353 integrates a distance information set by the distance information setting unit 351, a heat source information value set by the heat source information setting unit 352 and a single-wavelength temperature or a dual-wavelength temperature selected by the temperature information selector 354 so as to output it to the determination unit 360.

The heat source detection device 3 of the present embodiment performs the processes in step S1 through step S6 illustrated in FIG. 8 as a heat source detection process. Among them, the processes in step S1 through step S4 and step S6 may be as described in the first embodiment respectively. Also, in the information setting process in step S5, for example instead of the process in step S510 illustrated in FIG. 11, the process of selecting one of a single-wavelength temperature and a dual-wavelength temperature and a process of integrating the selected temperature, the heat source information value and the distance information value so as to output it to the determination unit 360 are performed. A process of selecting a temperature is performed by the temperature information selector 354. In accordance with an input selection command, the temperature information selector 354 outputs the selected single-wavelength temperature or dual-wavelength temperature to the information output unit 353 as a temperature corresponding to a sensor output of a dual-wavelength infrared sensor. A process of integrating a selected temperature, heat source information value and a distance information value to output it is performed by the information output unit 353.

Note that a process of setting a heat source information value of each pixel and a process of setting a distance information value of each pixel in an information setting process performed by the information setting unit 350 of the present embodiment may be performed in an arbitrary order or may be performed in parallel as described in the first embodiment. Further, in an information setting process performed by the information setting unit 350 of the present embodiment, a process of setting a heat source information value of each pixel, a process of setting a distance information value of each pixel and a process of selecting an output conversion temperature may be performed in parallel.

<Fourth Embodiment>

In the present embodiment, explanations will be given for a different example of an information setting process performed by the heat source detection device 3. The heat source detection system 1 of the present embodiment includes the image pickup device 2, the heat source detection device 3 and the display device 4 as illustrated in FIG. 1. The image pickup device 2 includes the dual-wavelength infrared sensor 200 and outputs an sensor output in a first wavelength band and a sensor output in a second wavelength band in an infrared wavelength band as described in the first embodiment. Also, as described in the first embodiment, the heat source detection device 3 includes the first correction unit 300, the second correction unit 305, the single-wavelength temperature calculator 310, the dual-wavelength temperature calculator 330, the information setting unit 350 and the determination unit 360. The information setting unit 350 in the heat source detection device 3 of the present embodiment includes the distance information setting unit 351, the heat source information setting unit 352 and the information output unit 353 as described in the first embodiment for example (see FIG. 7). The distance information setting unit 351 included in the information setting unit 350 of the present embodiment sets a distance information value representing whether a distance to the heat source is a short distance or a long distance, based on a ratio between a single-wavelength temperature and a dual-wavelength temperature.

The heat source detection device 3 of the present embodiment performs the processes in step S1 through step S6 illustrated in FIG. 8 as a heat source detection process. Among them, the processes in step S1 through step S4 and step S6 may be as described in the first embodiment respectively. By contrast, in the heat source detection device 3 of the present embodiment, a process illustrated in FIG. 22 for example is performed as the process in step S5 (information setting process).

Figure 22:
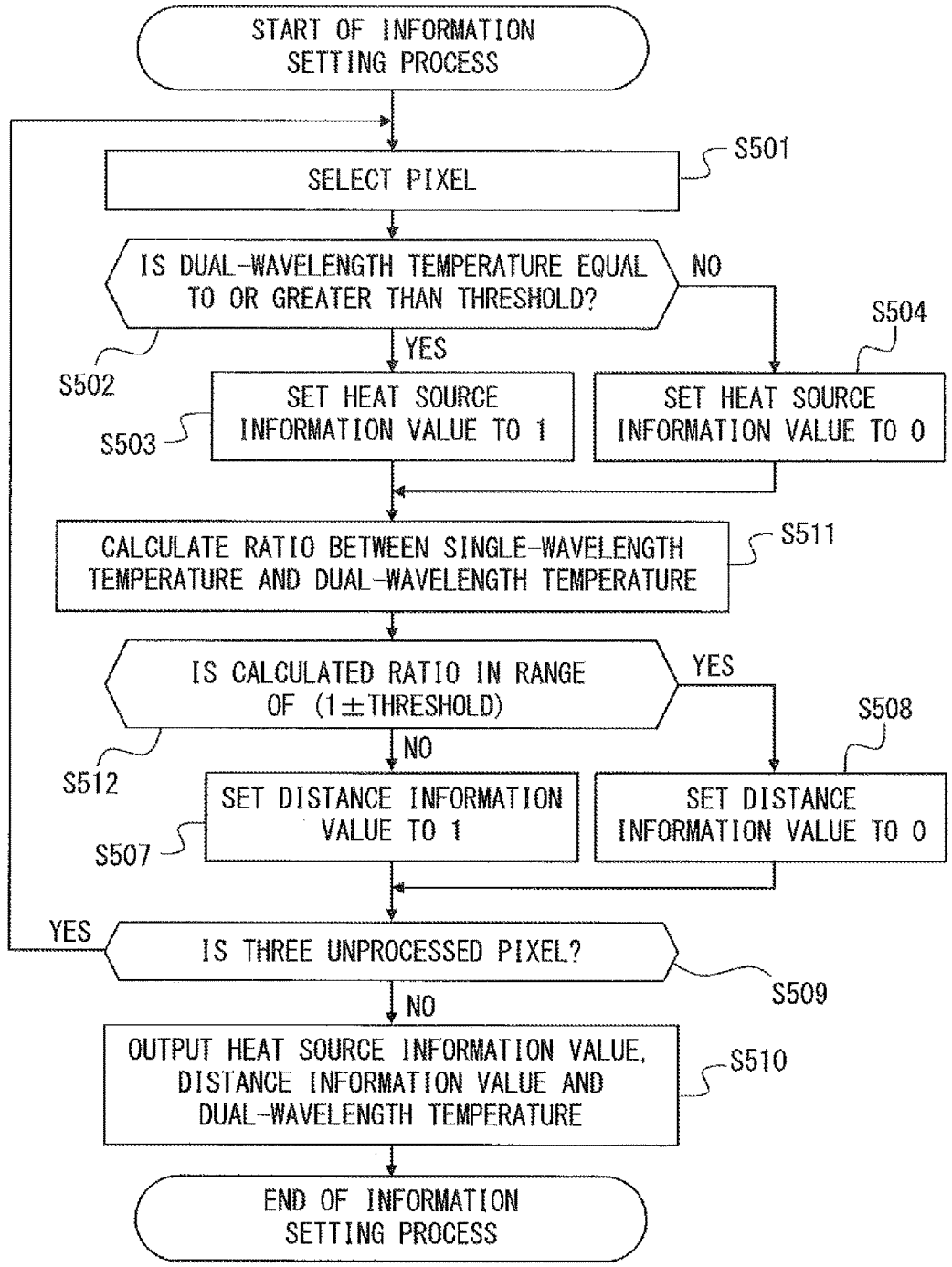
FIG. 22 is a flowchart explaining the contents of an information setting process of a fourth embodiment.

FIG. 22 is a flowchart explaining the contents of an information setting process of the fourth embodiment. Note that in the flowchart illustrated in FIG. 22, the same processes as those explained in the first embodiment (see FIG. 11) are denoted by the same step numbers (such as S501, S502, etc.) as those denoting the steps in FIG. 11

The information setting process in FIG. 22 is performed by the information setting unit 350. The information setting unit 350 first selects a pixel as a process target (step S501). Step S501 is performed by the distance information setting unit 351 and the heat source information setting unit 352. In step S501, the distance information setting unit 351 for example selects a pixel as a process target and reports the selected pixel to the heat source information setting unit 352, and thereby both of them select a common pixel. A pixel selected in step S501 is one photodetector in the dual-wavelength infrared sensor 200.

Next, the information setting unit 350 determines whether or not the dual-wavelength temperature of the selected pixel is equal to or greater than a threshold (step S502). Step S502 is performed by the heat source information setting unit 352. When the dual-wavelength temperature is equal to or greater than a prescribed threshold (YES in step S502), the heat source information setting unit 352 sets the heat source information value of the selected pixel to a value representing the detection of a high-temperature heat source (for example "1") (step S503). When the dual-wavelength temperature is smaller than the threshold (NO in step S502), the heat source information setting unit 352 sets the heat source information value of the selected pixel to a value representing that a high-temperature heat source has not been detected (for example "0") (step S504).

After step S503 or step S504, the information setting unit 350 calculates a ratio between the single-wavelength temperature and the dual-wavelength temperature of a selected pixel (step S511), and determines whether or not the calculated ratio is in a range of (1±threshold) (step S512). The processes in step S511 and step S512 are performed by the distance information setting unit 351. When the calculated ratio is in a range of (1±threshold) (YES in step S512), the distance information setting unit 351 sets the distance information value of the selected pixel to a value representing that the distance to the heat source is a short distance ("0" for example) (step S508). When the calculated ratio is out of a range of (1±threshold)) (NO in step S512), the distance information setting unit 351 sets the distance information value of the selected pixel to a value representing that the distance to the heat source is a long distance (for example"1") (step S507). Note whether to treat a ratio calculated in step S511 as being in a range of (1±threshold) or out of the range when the ratio is (1+threshold) or (1−threshold) is to be selected arbitrarily, and it is to be set in advance.

After step S507 or step S508, the information setting unit 350 determines whether or not there is an unprocessed pixel (step S509). When there is an unprocessed pixel (YES in step S509), the information setting unit 350 repeats the processes in step S501 through step S509. When there is no unprocessed pixel, i.e., when the process has been performed on all the pixels (NO in step S509), the information setting unit 350 integrates the heat source information value, the distance information value and the dual-wavelength temperature so as to output it to the determination unit 360 (step S510). The process in step S510 is performed by the information output unit 353. After the process in step S510, the information setting unit 350 terminates the information extraction process that uses a pair of the single-wavelength temperature and the dual-wavelength temperature.

In the information setting process of the present embodiment, as described above, it is determined whether a distance to the heat source is a short distance or a long distance based on a ratio between a single-wavelength temperature and a dual-wavelength temperature. As illustrated in FIG. 16A, when a distance to the heat source is a short distance, a single-wavelength temperature in pixels in which the heat source was imaged (an average value of conversion temperatures) and a dual-wavelength temperature (conversion temperature of an output ratio) have nearly the same values. Therefore, a ratio between a single-wavelength temperature and a dual-wavelength temperature in a case when a distance to the heat source is a short distance is a value close to one. When a distance to the heat source is a long distance, a difference between a single-wavelength temperature and a dual-wavelength temperature in a pixel in which the heat source was imaged is great as illustrated in FIG. 16B. Thus, when calculating a ratio between a single-wavelength temperature and a dual-wavelength temperature, a difference between a ratio of a case when a distance to the heat source is a long distance and one is greater than a difference between a ratio of a case when a distance to the heat source is a short distance and one. Thus, it is possible to determine (estimate) whether the heat source is located at a long distance or a short distance based on whether or not a ratio between a single-wavelength temperature and a dual-wavelength temperature is in a range of (1±threshold) (or whether or not a ratio between a single-wavelength temperature and a dual-wavelength temperature is in a range including one).

The flowchart illustrated in FIG. 22 is an example of a process performed by the information setting unit 350 of the present embodiment. The information setting unit 350 of the present embodiment may perform the processes in step S502 through step S504 after the processes in step S510, step S511, step S507 and step S508. Further, the information setting unit 350 may perform the processes in step S502 through step S504 and the processes in step S510, step S511, step S507 and step S508 in parallel. When the processes in step S502 through 504 and the processes in step S510, step S511, step S507 and step S508 are performed in parallel, the selection order of pixels in the processes in step S502 through 504 and the selection order of pixels in the processes in step S505 through 508 may be different.

Also, the information setting unit 350 of the present embodiment may include the temperature information selector 354 described in the third embodiment.

Further, the single-wavelength temperature calculator 310 in the heat source detection device 3 of the present embodiment may treat a first conversion temperature or a second conversion temperature as a single-wavelength temperature as explained in the second embodiment. Also, the single-wavelength temperature calculator 310 in the heat source detection device 3 of the present embodiment may treat one of a first conversion temperature, a second conversion temperature and an average value of first and second conversion temperatures as a single-wavelength temperature.

The heat source detection device 3 in the above embodiments may be implemented by for example a computer and a program executed by the computer. Hereinafter, by referring to FIG. 23, the heat source detection device 3 implemented by a computer and a program will be explained.

Figure 23:
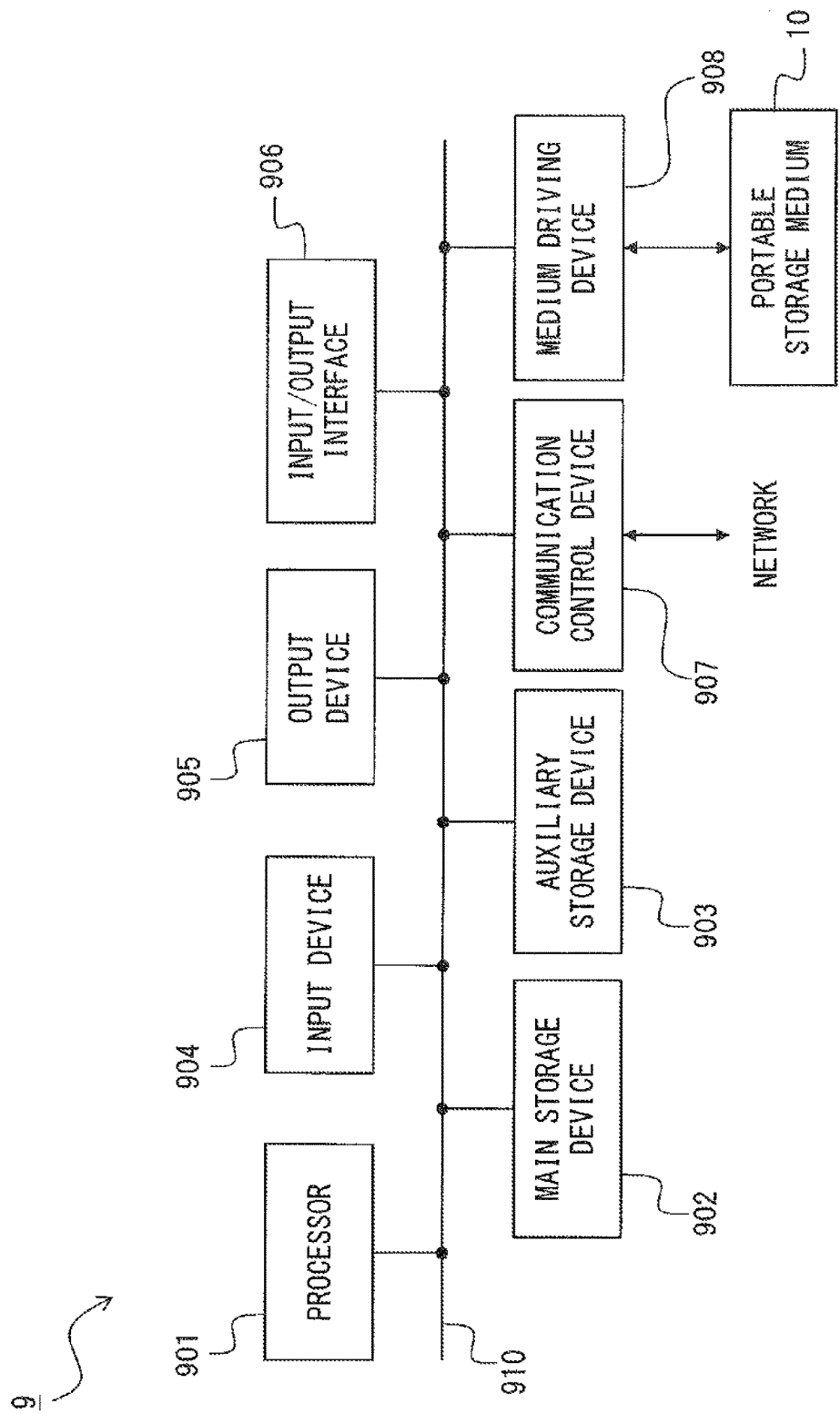
FIG. 23 illustrates a hardware configuration of a computer.

FIG. 23 illustrates a hardware configuration of a computer.

As illustrated in FIG. 23, a computer 9 includes a processor 901, a main storage device 902, an auxiliary storage device 903, an input device 904, an output device 905, an input/output interface 906, a communication control device 907 and a medium driving device 908. These components 901 through 908 in the computer 9 are connected to each other via a bus 910 so that data can be exchanged between the components.

The processor 901 is a Central Processing Unit (CPU) or a Micro Processing Unit (MPU), etc. The processor 901 controls the overall operations of the computer 9 by executing various types of programs including the operating system. Also, the processor 901 performs for example the heat source detection processes illustrated in FIG. 8 through FIG. 11.

The main storage device 902 includes a read only memory (ROM) and a random access memory (RAM), which are not illustrated. The ROM of the main storage device 902 has recorded in advance for example a prescribed basic control program read by the processor 901 upon the activation of the computer 9. Also, the RAM of the main storage device 902 is used as a working storage area as needed when the processor 901 executes various types of programs. The RAM of the main storage device 902 can be used for storing for example a correction coefficient that is referred to when first and second sensor outputs obtained from the image pickup device 2 are corrected, and conversion information that is referred to when a sensor output is converted into a temperature. Also, the RAM of the main storage device 902 can be used for storing for example a corrected sensor output, a single-wavelength temperature and a dual-wavelength temperature (conversion temperatures), a distance information value set by the information setting unit, a heat source information value, etc.

The auxiliary storage device 903 is a storage device, such as a non-volatile memory such as a flash memory (including a Solid State Drive (SSD)), a hard disk drive (HDD) etc., having a capacity larger than that of the main storage device 902. The auxiliary storage device 903 can be used for storing various types programs executed by the processor 901, and various types of data etc. The auxiliary storage device 903 can be used for storing for example a program etc. including the heat source detection processes described in the respective embodiments. Also, the auxiliary storage device 903 can be used for storing for example a sensor output, a correction coefficient, conversion information, a conversion temperature, a determination result of a heat source (detection result), etc.

The input device 904 is for example a keyboard device, a touch panel device, etc. In response to a manipulation performed by the operator of the computer 9, the input device 904 transmits input information associated with the manipulation to the processor 901. The input device 904 can be sued for inputting (specifying) a selection command described in the second and third embodiments.

The output device 905 is for example a display device such as a liquid crystal display device etc. The output device 905 can be used for displaying for example the operation status of the computer 9, a result of a heat source detection process, etc. In other words, the output device 905 can be used as the display device 4 in the heat source detection system 1 illustrated in FIG. 1. Also, the output device 905 may include for example an audio output device such as a speaker device, a buzzer, etc. An audio output device can be used for example reporting detection of a high-temperature heat source through audio. Further, the output device 905 may include for example a printer.

The input/output interface device 906 connects the computer 9 and other electronic devices. The input/output interface 906 includes a connect etc. based on a universal serial bus (USB) standard. The input/output interface 906 can be used for connecting for example the computer 9 and the image pickup device 2.

The communication device 907 connects the computer 9 to a communication network so as to control communications between the computer 9 and other electronic devices via the communication network. The communication control device 907 can be used for communications between for example the computer 9 and the image pickup device 2 or communications between the computer 9 and a server device etc. that accumulates sensor outputs output from the image pickup device 2. Also, the communication control device 907 can be used for communications between for example the computer 9 and a server device etc. that collects detection results of the heat source by the computer 9 to manage them.

The medium driving device 908 reads a program or data recorded in a portable storage medium 10 and writes data etc. stored in the auxiliary storage device 903 to the portable storage medium 10. As the medium driving device 908, for example a reader/writer for memory card compatible with a one or a plurality of types of standard can be used. When a reader/writer for memory card is used as the medium driving device 908, as the portable storage medium 10, a memory card (flash memory) etc. based on for example a standard with which the read/writer is compatible such as a Secure Digital(SD) standard can be used. Also, as the portable storage medium 10, a flash memory including for example a USB standard connector can be used. Further, when the computer 9 includes an optical disk drive that can be used as the medium driving device 908, various types of optical disks that can be recognized by that optical disk drive can be used as the portable storage medium 10. Examples of an optical disk that can be used as the portable storage medium 10 are a Compact Disc (CD), a Digital Versatile Disc (DVD), a Blu-ray Disc (Blu-ray is a registered trademark), etc. The portable storage medium 10 can be used for storing a program including the above heat source detection processes, a correction coefficient, conversion information, a result of detecting a heat source, etc.

Giving the computer 9 an instruction to start the heat source detection process illustrated in FIG. 8 makes the processor 901 read and execute a program including a heat source detection process stored in a non-transitory recording medium such as the auxiliary storage device 903 etc. Upon this, the processor 901 functions (operates) as the correction output calculators 302 and 307, the single-wavelength temperature calculator 310 (except the conversion information storage), the dual-wavelength temperature calculator 330 (except the conversion information storage), the information setting unit 350 and the determination unit 360. Also, the RAM of the main storage device 902, the auxiliary storage device 903, etc. function as the correction coefficient storage 301 and 306 and the conversion information storage 312 and 315 and as a buffer (not illustrated) that stores a single-wavelength temperature, a dual-wavelength temperature, a distance information value, a heat source information value, etc.

Note that computer 9 used as the heat source detection device 3 does not have to include all the constituents 901 through 908 illustrated in FIG. 23, and some of the constituents may be omitted in accordance with the purposes or conditions. For example, the computer 9 may omit the medium driving device 908 or the communication control device 907.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A heat source detection device comprising:
an infrared sensor configured to detect infrared radiation across a first infrared wavelength band and a second infrared wavelength band that is different from the first infrared wavelength band;
a memory configured to store first conversion information representing a relationship between a first output output from the infrared sensor in accordance with an incident amount of the infrared radiation across the first infrared wavelength band detected by the infrared sensor and a temperature, second conversion information representing a relationship between a second output from the infrared sensor in accordance with an incident amount of the infrared radiation across the second infrared wavelength band detected by the infrared sensor and a temperature, and third conversion information representing a relationship between a ratio between the first and second outputs and a temperature; and
a processor configured to detect a heat source based on the first and second outputs output from the infrared sensor, the first conversion information, the second conversion information and the third conversion information stored in the memory, wherein
a process performed by the processor to detect the heat source includes
calculating, as a single-wavelength temperature, one of a first temperature obtained by converting the first output output from the infrared sensor into a temperature, a second temperature obtained by converting the second output output from the infrared sensor together with the first output into a temperature and an average value of the first and second temperatures, and calculating a dual-wavelength temperature obtained by converting the ratio between the first and second outputs into a temperature, and
determining a temperature of the heat source based on the dual-wavelength temperature and determining a distance to the heat source from the infrared sensor based on a value indicating one of a temperature difference and a temperature ratio, the temperature difference being a difference between the single-wavelength temperature and the dual-wavelength temperature, the temperature ratio being a ratio between the single-wavelength temperature and the dual-wavelength temperature.

2. The heat source detection device according to claim 1, wherein
the process performed by the processor includes:
determining whether or not the heat source has a temperature that is higher than a prescribed temperature based on a magnitude relationship between the dual-wavelength temperature and a prescribed temperature threshold.

3. The heat source detection device according to claim 1, wherein
the process performed by the processor includes:
determining a distance to the heat source of a case when an absolute value of a difference between the single-wavelength temperature and the dual-wavelength temperature is equal to or greater than a prescribed threshold to be longer than a distance to the heat source of a case when the absolute value of a difference is smaller than the prescribed threshold.

4. The heat source detection device according to claim 1, wherein
the process performed by the processor includes:
determining a distance to the heat source of a case when a ratio between the single-wavelength temperature and the dual-wavelength temperature is in a prescribed range including one to be shorter than a distance to the heat source of a case when the ratio is out of the prescribed range.

5. The heat source detection device according to claim 1, wherein
the process performed by the processor includes:
selecting one of the first and second temperatures as the single-wavelength temperature, and
calculating only the selected one of the first and second temperatures as the single-wavelength temperature.

6. The heat source detection device according to claim 1, wherein
the process performed by the processor includes:
correcting the first and second outputs based on a sensitivity of the infrared sensor,
calculating the first temperature by converting the corrected first output , and
calculating the second temperature by converting the corrected second output.

7. A heat source detection method comprising:
detecting, by an infrared sensor, infrared radiation across a first infrared wavelength band and a second infrared wavelength band that is different from the first infrared wavelength band;
calculating, by a computer and as a single-wavelength temperature, one of a first temperature obtained by converting a first output output from the infrared sensor in accordance with an incident amount of the infrared radiation across the first infrared wavelength band detected by the infrared sensor into a temperature, a second temperature obtained by converting a second output output from the infrared sensor in accordance with an incident amount of the infrared radiation across the second infrared wavelength band detected by the infrared sensor into a temperature and an average value of the first and second temperatures, and calculating a dual-wavelength temperature obtained by converting the ratio between the first and second outputs into a temperature; and
determining, by the computer, a temperature of the heat source based on the dual-wavelength temperature and determining a distance to the heat source from the infrared sensor based on a value indicating one of a temperature difference and a temperature ratio, the temperature difference being a difference between the single-wavelength temperature and the dual-wavelength temperature, the temperature ratio being a ratio between the single-wavelength temperature and the dual-wavelength temperature.

8. A non-transitory computer-readable recording medium having stored therein a program that causes a computer to execute a process for detecting a heat source based on an output from an infrared sensor configured to detect infrared radiation across a first infrared wavelength band and a second infrared wavelength band that is different from the first infrared wavelength band, the process comprising:

calculating, as a single-wavelength temperature, one of a first temperature obtained by converting a first output output from the infrared sensor in accordance with an incident amount of the infrared radiation across the first infrared wavelength band into a temperature, a second temperature obtained by converting a second output output from the infrared sensor in accordance with an incident amount of the infrared radiation across the second infrared wavelength band detected by the infrared sensor into a temperature and an average value of the first and second temperatures, and calculating a dual-wavelength temperature obtained by converting the ratio between the first and second outputs into a temperature; and determining a temperature of the heat source based on the dual-wavelength temperature and determining a distance to the heat source from the infrared sensor based on a value indicating one of a temperature difference and a temperature ratio, the temperature difference being a difference between the single-wavelength temperature and the dual-wavelength temperature, the temperature ratio being a ratio between the single-wavelength temperature and the dual-wavelength temperature.

\* \* \* \* \*